United States Patent [19]

Baker

[11] Patent Number: 5,590,332
[45] Date of Patent: Dec. 31, 1996

[54] GARBAGE COLLECTION, TAIL RECURSION AND FIRST-CLASS CONTINUATIONS IN STACK-ORIENTED LANGUAGES

[76] Inventor: Henry G. Baker, 16231 Meadow Ridge Way, Encino, Calif. 91436

[21] Appl. No.: 372,514

[22] Filed: Jan. 13, 1995

[51] Int. Cl.$^6$ .................................................. G06F 9/45
[52] U.S. Cl. ................................ 395/705; 395/622
[58] Field of Search ................................ 395/600, 650, 395/700

[56] References Cited

U.S. PATENT DOCUMENTS

| | | | |
|---|---|---|---|
| 4,922,414 | 5/1990 | Holloway et al. | 364/200 |
| 4,951,194 | 8/1990 | Bradley et al. | 364/200 |
| 5,355,483 | 10/1994 | Serler | 395/650 |
| 5,386,520 | 1/1995 | Gillet | 395/375 |
| 5,396,632 | 3/1995 | Gillet | 395/725 |

OTHER PUBLICATIONS

Baker, "Cons should not Cons its Arguments", ACM Sig. Plan Notices, vol. 27, No. 3, Mar. 1992, pp. 24–34.
Tarditi et al., "No Assembly Required: Compiling Standard ML to C", ACM Letters on Prog. Lang. and Sys., vol. 1, No. 2, 1992, pp. 161–177.
R. Hieb et al., "Representing Control in the Presence of First–Class Continuations", ACM SigPlan'90 Conf. on Prog. Lang. Design and Implementation, Jun. 1990, pp. 66–77.

*Primary Examiner*—Kevin A. Kriess
*Assistant Examiner*—Kakali Chaki
*Attorney, Agent, or Firm*—Daniel R. Kimbell

[57] ABSTRACT

Methods for implementing garbage collection, tail recursion and first-class continuations for advanced computer applications in a stack-oriented language. Objects, including assignable cells, subprogram closure objects and continuation objects, can be allocated within the invocation frames of the stack-oriented language and these objects will be evacuated from the invocation frames before these frames are deallocated. The techniques enable a tail-call optimization by which a tail-recursion can be executed in constant net space for the invocation frames of the tail-recursive subprogram. The technique, when combined with a continuation-passing style of programming in stack-oriented computer languages, also allows an efficient implemention of garbage collection and first-class continuations. Our technique is useful in the interpretation and compilation of advanced computer languages which incorporate the features of tail-recursion, first-class continuations and/or garbage collection.

18 Claims, No Drawings

GARBAGE COLLECTION, TAIL RECURSION AND FIRST-CLASS CONTINUATIONS IN STACK-ORIENTED LANGUAGES

BACKGROUND OF THE INVENTION

1. Field of Invention

The present invention relates to the programming of a data processing system. More specifically, the invention relates to the implementation of advanced computer language features such as tail-recursion optimization, first-class continuations and garbage collection when implementing applications in a stack-oriented computer language.

2. Field of the Prior Art

Stack-oriented computer languages—e.g., Algol, PL/I, Pascal, Ada, C, C++, to name just a few—are utilized to program a large fraction of the computer applications software in use today, and the architectures of a large fraction of computers are optimized for these types of languages. The techniques for efficiently implementing these languages are well-known in the art of computer science, and are covered in a number of textbooks—e.g., [Aho86]. (References in square brackets appearing in the specification are described in Appendix A attached hereto.)

However, a number of advanced computer languages—e.g., Scheme [Scheme90], Smalltalk [Goldberg83], and ML [Milner90], to name just a few—incorporate advanced features that are not easily implemented on computer architectures optimized for stack-oriented languages. Some of these advanced features include tail recursion, first-class continuations, and garbage collection.

Tail recursion is often considered an optimization, which is a program transformation that improves the efficiency of the program in execution time or storage space. Tail recursion is a process of replacing a certain type of recursive computation by an iterative computation which more efficiently produces the same effect and/or result.

According to [Aho86, pp. 52–53], "Certain recursive calls can be replaced by iterations. When the last statement executed in a procedure body is a recursive call of the same procedure, the call is said to be tail recursive. . . . We can speed up a program by replacing tail recursion by iteration. For a procedure without parameters, a tail-recursive call can be simply replaced by a jump to the beginning of the procedure."

According to [Abelson85, p. 33] "Tail recursion has long been known as a compiler optimization trick. A coherent semantic basis for tail recursion was provided by Carl Hewitt . . . Inspired by this, Gerald Jay Sussman and Guy Lewis Steele Jr. [Sussman75] constructed a tail-recursive interpreter for Scheme. Steele later showed how tail recursion is a consequence of the natural way to compile procedure calls."

An advanced language that guarantees tail recursion—e.g., IEEE standard Scheme [Scheme90]—does not require special iterative or looping constructs in order to execute loops and iteration efficiently. Thus, the 'do', 'for', 'while', and 'until' constructs found in languages like Fortran, Algol, PL/I, Pascal, C, C++, to name just a few, can be replaced by recursions which can be compiled as efficiently as the iterative looping constructs. This efficiency means that the complexity of compilers and programming languages which deal specially with looping constructs can be reduced by utilizing an efficient form of recursion in its place. Furthermore, according to [Kernighan88], ". . . recursive code is more compact, and often much easier to write and understand than the non-recursive equivalent."

Stack-oriented languages do not guarantee tail-recursive implementation of subprogram calls. Some particular compilers may provide for a tail recursion optimization in some particular cases, but a portable program written in a stack-oriented language cannot rely upon tail recursion on a wide variety of implementations of the language.

Another advanced computer language feature is that of first-class continuations. Continuations can be used to implement non-local transfers of control. A relatively simple kind of non-local transfer of control is that of the ANSI C language setjmp/longjmp pair [Kernighan88] [Harbison91] [Plauger92]. A C program may execute a setjmp function and then call a number of other nested functions. Within this nesting, a longjmp function can be executed which transfers immediately back to the context saved by the setjmp function. Any functions in the nest which have been called, but have not yet returned, will never return, and will simply be abandoned. A more sophisticated use of continuations is to implement multiple processes by means of interrupts and time-sharing [Wand80]. A still more sophisticated use of first-class continuations is Prolog-like back-tracking [Haynes87].

Stack-oriented languages implement only the simplest kind of continuations, if they implement continuations at all. ANSI C [Kernighan88] [Harbinson91] [Plauger92] is typical in that it defines the meaning of setjmp/longjmp only in the cases where the longjmp is dynamically nested within the enclosing setjmp. Furthermore, C makes no provision whatsoever for saving the result of a setjmp as a first-class continuation data object which can be passed as an argument to a function, returned as the result of a function, or stored into a programmer-defined data structure.

Another advanced computer language feature is automatic storage reclamation or garbage collection. Computer languages, including stack-oriented computer languages such as PL/I, Pascal, Ada, C, C++, to name a few, have long offered dynamic allocation of data objects both on the stack and in a separate area usually called the 'heap' [Aho86]. The heap allocation of objects is utilized whenever the lifetime of these objects does not match the LIFO (Last-In, First-Out) allocation/deallocation behavior of a stack. In these languages, it is the responsibility of the programmer to deallocate data objects which are no longer in use, so that the storage they occupy can be reused for a new data object.

There is a problem, however. When pointers/references to a data object are stored in other data objects, it may be quite difficult for a programmer to make sure that a data object is no longer in use before he or she deallocates it. This problem is particularly severe in large applications which have developed over a number of years with a large number of programmers and which interface to software for which the programmer may not have access to the source code. As a result, a programmer may inadvertently deallocate an object which is still in use and subsequently reuse this storage for another purpose. When the deallocated object is referenced again, the application will usually fail—sometimes in a catastrophic manner. This problem is known as the 'dangling pointer' problem.

One attractive solution to the dangling pointer problem is to move the responsibility of deallocation from the programmer to the programming language implementation. The parts of the system which take on this responsibility are often called automatic memory managers or garbage collectors. A garbage collector operates by looking at all of the application program variables which are directly accessible, and then following all chains of pointers from these variables to objects in the stack and the heap. Any object found in this way is called 'accessible', because it can conceivably be accessed by the application program by following a finite chain of pointers from a directly accessible program variable. The storage for inaccessible objects can then be reclaimed for reuse. Alternatively, the accessible objects can all be copied and relocated to a new area of memory, and the entire old area can then be reused for a new purpose. Such an automatic memory manager or garbage collector is said to implicitly deallocate inaccessible objects.

The art of automatic memory management and garbage collection is quite advanced. [Cohen81], [McEntee87], and [Bekkers92] review some of this art.

Stack-oriented computer languages are not inconsistent with implicit storage deallocation and garbage collection— e.g., the Algol-68 computer language offers garbage collection—but few implementations offer it. The most popular stack-oriented computer languages—e.g., Pascal, Ada, C, C++, to name just a few—do not utilize implicit storage deallocation and garbage collection, and therefore applications programs written in these languages run the risk of creating 'dangling references' and thereby causing catastrophic software failures called 'crashes'. The number of crashes in commercially distributed software due to these dangling references is testimony to the ubiquity and seriousness of this problem.

There are two major problems in retrofitting garbage collection into a stack-oriented language. The first is in tagging all of the data objects so that the garbage collector can know the boundaries of the object, as well as finding and tracing all of the pointers within the data object. The second is in finding all of the directly accessible program variables or 'roots' for the garbage collection. Some of these program variables are global and/or static, and are not usually difficult to locate and identify to the garbage collector. The more difficult problem is that of locating and identifying the program variables that have been allocated on the stack, but for which a map to their location has not be provided by the compiler.

One general approach to these problems has been called 'conservative' garbage collection [Boehm88] [Bartlett88]. Conservative garbage collectors do not attempt to precisely locate and identify all of the program variables or accessible objects, but only guess at their locations. These collectors are conservative, in that they attempt to err on the side of conservatism, in that any bit pattern that looks like it might be a pointer is assumed to actually be a pointer. A conservative garbage collector will treat the entire stack area as a source of 'ambiguous roots' [Bartlett88], and any storage location which is pointed at by a suspected pointer is considered to be an accessible object if it is located in one of the storage areas in which accessible objects can be found. Suspected pointers found within 'objects' located in this manner are also traced by the conservative garbage collector, in case the suspected object really is accessible to the running program.

Conservative garbage collectors have two significant problems. The most common problem is that their conservatism causes them to consider too much storage as accessible. Some researchers [Zorn92] have found that a conservative garbage collector may be less efficient because it may 'hold onto' significantly more storage than a more precise collector would. It may also incur a greater cost in scanning time due to its imprecise knowledge about where accessible pointers are to be found. A less common, but more troubling problem, is that a conservative collector may fail to be conservative, and may miss some accessible objects, possibly due to aggressive compiler optimizations [Chase88]. Since an object which is accessible to the program, but is not considered accessible to the conservative garbage collector, will eventually be reallocated for a new purpose, a 'conservative' garbage collector may actually cause a crash due to a dangling pointer in a program that would have operated correctly without the conservative collector. Although the known occurrences of dangling reference problems with conservative garbage collectors are very rare, the mere possibility of such problems raises serious doubts about the usability of this form of garbage collector for many applications.

The art of directly implementing advanced language features like tail recursion, first-class continuations and garbage collection in machine (or machine-like) languages is well-advanced. [Hanson90] is a recent review of some techiques of tail recursion; [Clinger88] is a review of some techniques of first-class continuations; and [Bekkers92] includes reviews of some techniques for garbage collection. Appel's approach to the Standard ML of New Jersey implementation [Appel88] [Appel89] [Appel0] [Appel92] of the ML programming language [Milner90] is particularly elegant and efficient.

Unfortunately, compilers which target machine languages are expensive and time-consuming to build, and with the increased complexity of generating code for highly pipelined RISC architectures, compilers targeting machine language will become even more expensive. Thus, the costs of supporting a language implementation on a wide variety of different instruction set architectures are growing quickly. This trend has caused a tendency for machine vendors to provide one or two compilers which directly target machine code—usually C and Fortran—and those wishing to support advanced languages such as Scheme or ML will seriously consider building compilers which translate those languages into C or Fortran, so that their language implementation will remain portable over a wide variety of instruction set architectures.

Although portability (and hence lower cost) is the major advantage for compilers to target languages like C or Fortran instead of machine language, there are other advantages. There are significant execution efficiencies to be gained through proper 'instruction scheduling' of complex pipelines, and since the existing C and Fortran compiler vendors already have enormous incentives to provide these difficult optimizations, a compiler which targets C or Fortran instead of machine code can 'piggy-back' on these efforts to gain the advantages at very low cost. There are also a substantial number of development and debugging tools available for C and Fortran programs that may not be available for machine language programs, so additional leverage is gained for these purposes. Finally, a large number of third-party subprogram 'packages' already exist in C or Fortran—e.g., for computing transcendental functions—and the compiler targeting C or Fortran can utilize these, as well.

So some of the options facing the writer of an application which requires advanced computer language features such as tail recursion, first-class continuations, and/or garbage collection is to either 1) find an advanced language implementation of a language like Scheme or ML which compiles directly into native machine code for his chosen hardware processor; or 2) program his application in a less-advanced stack-oriented language such as C; or 3) write a Scheme or ML compiler which compiles directly into native machine code; or 4) write part or all of his application in assembly language for the native machine code. Options 1), 3) and 4) are very expensive, and option 2) is very difficult, error-prone, and most likely very non-portable.

Some of the options facing the writer of a compiler for a language having advanced features are 1) compile directly into native machine code, or 2) target an existing efficient implementation of C or Fortran. Option 1 can result in very efficient execution performance, but is very expensive. Option 2 can, and has been, done, but has significant problems of its own.

There are major problems implementing programs requiring tail recursion, first-class continuations, and garbage collection in a stack-oriented language like C that does not already have these features. Implementing tail-recursion can sometimes be done by converting the recursion into iteration, which can only be done within a single 'block' compilation unit, and sometimes not even then [Bartlett89]. A more general method for achieving proper tail recursion in a stack-oriented language uses a trampoline, also called a dispatch loop. A trampoline is an outer function which iteratively calls an inner function. The inner function returns the address of another function to call, and the outer function then calls this new function. In other words, when an inner function wishes to call another inner function tail-recursively, it returns the address of the function it wants to call back to the trampoline, which then calls the returned function. By returning before calling, the stack is first popped so that it does not grow without bound on a simple iteration. Unfortunately, the cost of such a trampoline function call is 2–3 times slower than a normal subprogram call, and it requires that arguments be passed in global variables [Tarditi90]. Another alternative is to tamper with the C compiler itself, but this alternative is also not portable.

Implementing first-class continuations on top of a stack-oriented language like C typically requires non-portable machine language access to the details of the stack format [Bartlett89]. Furthermore, many mutable objects such as assignable cells cannot be allocated on the stack due to the multiplicity of copies of the stack that can exist, so some optimizations are impossible to perform [Clinger88].

Implementing garbage collection on top of a stack-oriented language like C requires either the use of a secondary stack [Yuasa90] [Chailloux92] and/or the use of a conservative garbage collector [Boehm88] [Bartlett88], which may be both inefficient and insecure. Discussions of additional references are attached hereto in Appendix B ("Additional Related Art"). References from Appendices A, B, and C are incorporated by reference herein.

In summary, to utilize and/or compile advanced language features such as tail recursion, first-class continuations, or garbage collection, we have either Appel's elegant, efficient and expensive method of utilizing native machine language [Appel88] [Appel89] [Appel90] [Appel92], or we have cheaper methods of using stack-oriented languages like C which are crude, complex, and potentially catastrophic [Bartlett88] [Bartlett89] [Boehm88] [Tarditi90] [Chase88]. The existing art tries to either ignore the stack [Sussman75] [Appel90] [Tarditi90], or to utilize the normal Last-In, First-Out (LIFO) behavior of the stack as much as possible through complex optimizations [Steele78] [Bartlett89] [Tarditi90].

There accordingly exists a need for an improved method to utilize and/or compile advanced language features such as tail recursion, first-class continuations, and garbage collection which is both efficient and reliable ("crash proof"), and cost effective to implement.

BRIEF DESCRIPTION OF THE INVENTION

The present invention makes use of the stack in a stack-oriented language to implement the desired advanced features, but in a novel way. The present invention makes use of the advantages of allocating storage for frames and objects on the stack, but does not normally deallocate storage from the stack, except under the control of a garbage-collection-like process. In this way, the dangers of unsupervised stack deallocation are eliminated, yet many of the advantages of using the stack are realized.

[Fischer72] describes the conversion of a program to continuation-passing style (CPS) for execution on the stack of a stack-oriented language for the purposes of a theoretical proof. He also comments that "a consequence of the above theorem is that free [heap] storage may be saved at the expense of increased use of the stack. In the absence of CONS [which allocates heap storage], the stack must grow arbitrarily large . . . ". Over twenty years passed before the present invention provided a solution to this problem of an arbitrarily large stack for the execution of continuation-passing style in a stack-oriented language.

The present invention utilizes the well-known technique of converting a program to continuation-passing style (CPS). If this CPS program is executed directly in the stack-oriented language implementation, the stack will grow and overflow its preassigned storage area. In the case of this stack overflow, the present invention solves this problem by utilizing a copying garbage collector process to evacuate any accessible data objects from the stack to the heap, after which the entire storage area of the stack may be reclaimed by contracting the stack, and the program restarted with the now-shortened stack.

Since in the practise of this invention the stack is usually given a predetermined fixed size, then the benefits of the decreased storage requirements of tail-recursion optimizations are achieved because only a small amount of accessible data will be relocated out of the stack when the stack is evacuated. The feature of first-class continuations is immediately available as the result of converting to continuation-passing style [Appel92, p. 135]. Finally, the ability to precisely determine accessible objects for garbage collection is also immediately available as the result of converting to continuation-passing style and representing continuations and closures as first-class data objects [Appel92, p. 135].

One aspect of the invention provides a method for executing an advanced application, said application comprising a number of related subprograms implemented in a stack-oriented language which includes both a stack and a heap, comprising the steps of:

converting one or more of said application subprograms into continuation-passing style (CPS) in the stack-oriented language;

determining the extent and limit points of a stack buffer on the execution stack of the stack-oriented language, which buffer is capable of holding a plurality of invocation stack frames;

commencing the execution of the application such that the initial invocation stack frame is within the limits of the stack buffer;

interrupting any of said CPS-converted subprograms when the execution stack pointer is beyond a limit point of the stack buffer;

initiating an evacuation process to transport out of the stack buffer into the heap any live data objects found in the stack buffer;

contracting the execution stack of the stack-oriented language back to the beginning of the stack buffer; and resuming the execution of the interrupted CPS-converted subprogram.

Another aspect of the invention provides a method for executing one or more mutually recursive subprograms implemented in a stack-oriented language which includes both a stack and a heap to achieve the benefits of tail recursion, comprising the steps of:

converting the subprograms into continuation-passing style (CPS) in the stack-oriented language;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

interrupting a CPS-converted subprogram when the execution stack pointer is beyond a limit point of the stack buffer;

initiating an evacuation process to transport out of the stack buffer into the heap any live data objects found in the stack buffer;

contracting the execution stack of the stack-oriented language back to the beginning of the stack buffer; and resuming the execution of the interrupted CPS-converted subprogram.

Yet another aspect of the invention provides a method for executing one or more subprograms of an application implemented in a stack-oriented language which includes both a stack and a heap to achieve the benefits of first-class continuations, comprising the steps of:

converting the subprograms into continuation-passing style (CPS) in the stack-oriented language so that continuation closure objects are local stack-allocated objects;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

capturing one of the stack-allocated continuation closure objects;

interrupting a CPS-converted subprogram when the execution stack pointer is beyond a limit point of the stack buffer;

initiating an evacuation process to transport out of the stack buffer into the heap any live data objects including live continuation closure objects found in the stack buffer;

contracting the execution stack of the stack-oriented language back to the beginning of the stack buffer; and resuming the execution of the interrupted CPS-converted subprogram.

Yet another aspect of the invention provides a method for executing one or more subprograms of an application implemented in a stack-oriented language which includes both a stack and a heap and a further garbage collector for said heap to achieve the benefits of precise garbage collection, comprising the steps of:

converting the subprograms into continuation-passing style (CPS) in the stack-oriented language so that continuation closure objects are local stack-allocated objects;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

interrupting a CPS-converted subprogram when the execution stack pointer is beyond a limit point of the stack buffer;

initiating an evacuation process to transport out of the stack buffer into the first generation of a garbage-collected heap any live data objects including live continuation closure objects found in the stack buffer;

contracting the execution stack of the stack-oriented language back to the beginning of the stack buffer; and resuming the execution of the interrupted CPS-converted subprogram.

OBJECTS AND ADVANTAGES OF THE INVENTION

The present invention provides methods for achieving advanced language features—i.e., tail recursion, first-class continuations and garbage collection—in a stack-oriented language.

One aspect of the invention is to provide the benefits of a tail-recursion optimization in a stack-oriented language which may not already offer such an optimization.

Another aspect of the invention is to provide the benefits of a tail-calling optimization for mutually recursive subprograms in a stack-oriented language which may not already offer such an optimization.

Another aspect of the invention is to provide the benefits of a tail-calling optimization for mutually recursive subprograms which are separately compiled in a stack-oriented language which may not already offer such an optimization.

Another aspect of the invention is to provide the benefits of a tail-calling optimization for mutually recursive subprograms without requiring complex analyses of the application utilizing such mutually recursive subprograms.

Another aspect of the invention is to provide the benefits of a tail-calling optimization for mutually recursive subprograms without requiring the block compilation of these subprograms.

Another aspect of the invention is to provide for garbage collection in a stack-oriented language which does not already offer garbage collection.

Another aspect of the invention is to provide for the precise (unambiguous) location of roots for garbage collection in a stack-oriented language which does not already offer garbage collection.

Another aspect of the invention is to provide for an efficient implementation of first-class continuations and continuation capture in a stack-oriented language.

Another aspect of the invention is to provide a simple and elegant method of compiling a language with advanced features such as tail-recursion, first-class continuations and garbage collection into a stack-oriented language which may not offer those advanced features.

Another aspect of the invention is to provide a simple and elegant method of compiling a language with advanced features such as tail-recursion, first-class continuations and garbage collection into a separate compilation units of a stack-oriented language which may not offer those advanced features.

Another aspect of the invention is to provide a simple and elegant method for safely allocating assignable cells, subprogram closures, and other objects on the stack of the stack-allocated language in such a way that they are relocated from the stack prior to the stack storage being reallocated for another use, and thus avoid 'dangling pointers'.

Another aspect of the invention is to provide a method for safely allocating assignable cells, subprogram closures, and other objects on the stack of the stack-allocated language without requiring complex compile-time analysis of the application which allocates said assignable cells, subprogram closures, and other objects.

SUMMARY OF THE INVENTION

The present invention teaches methods of implementing an application utilizing advanced features such as tail-recursion, first-class continuations, and/or garbage collection in a stack-oriented language that may not offer these advanced features. In particular, the present invention teaches methods of compiling an application written in a language having such advanced features into a stack-oriented computer language.

The method of the invention for implementing these advanced features involves converting one or more of the application subprograms into continuation-passing style (CPS) [Appel92] in such a way that some of the objects requiring storage allocation —e.g., assignable cells, subprogram closure records and other objects—are allocated as variables local to the current stack frame in the subprogram after being CPS transformed and translated into the stack-oriented language. A CPS-transformed subprogram will never return, and hence will never release its stack frame on the execution stack of the stack-oriented language [Fischer72]. This stack will eventually exceed a bound imposed by the invention, at which time execution of the application will be suspended in order that a copying garbage-collection-like process can relocate any live data objects (assignable cells, subprogram closures, and other objects) into a more permanent heap storage area. When this relocation process has completed, the runtime stack of the stack-oriented language will no longer contain live data objects, and it is then contracted through the deallocation of stack frames. This contraction may be achieved either through the execution of a 'longjmp' or 'throw' type of non-local exit operator, or it may be achieved by simply returning from all of the frames which are currently allocated on the stack, one by one. After the stack has been contracted, the application program then resumes execution with the now-smaller stack.

As a specific example of the method, consider the compilation of a program in the Scheme programming language into a program in the C programming language. The invention first converts the Scheme program into continuation-passing style (CPS), as is well-known in the art [Steele78] [Kranz86], and then translates the resulting Scheme functions/lambda-expressions more-or-less directly into C functions, again well-known in the art [Bartlett89] [Appel92]. In the present invention, Scheme arguments are passed as normal C arguments, and Scheme function calls become normal C function calls. First-class continuation closures and closure environments are passed as extra C arguments. Such a continuation-passing C program will not normally execute a C return, so the C stack will grow and grow. Since the C stack will not normally contract with such a program, we can safely allocate all of our closures and user data objects/structures on this stack as automatic/dynamic/local data. All closures and user data objects/structures whose sizes are known at compile time can be statically allocated as local 'automatic' variables in the C stack frame. If desired, dynamic arrays and other data objects/structures whose size is unknown at compile time may be allocated on the stack by the non-standard 'alloca' primitive (or equivalent) found in some C implementations, or they may be allocated directly in the heap by C's 'malloc' primitive (or equivalent).

In this simple CPS example, since none of the CPSC functions ever return, the only live frame on the C stack is the top one. However, since we have allowed many data objects to be stack-allocated as objects within a stack frame, there will be found within many of the dead frames accessible closures and accessible user data objects. Eventually, the C stack will overflow the predetermined buffer space allowed for it, and a first-generation copying garbage collection (GC) will be performed [Appel89]. There are a number of static roots already known to the GC, as well as the latest continuation closure which is passed to the GC as an argument. The live objects and live closures are all evacuated by being relocated (and thereby compacted) into a second generation heap area [Appel89] [Appel90], so that execution can be restarted via a C longjmp to a C setjmp at the beginning of the C stack.

A key point is that since only live frames and accessible objects are traced—i.e., the C frames, which are all dead, are not traced—The first-generation GC never has to know the detailed machine format of the C stack frame, and can therefore be written in portable C. This first-generation GC can also be called by explicit C code within each generated C function which checks if the predetermined limits of the C stack will be exceeded.

If the predetermined size of the C stack is a relatively small constant, the benefits of tail-recursion are obtained, because only a fixed number of garbage C stack frames can accumulate before they are reclaimed. The benefits of efficient first-class continuation capture are achieved because the continuation-passing style transformation makes always available a pre-packaged first-class continuation object for easy manipulation [Appel92]. Precise/unambiguous roots are available for use by the garbage collector because all roots are either static, or live arguments to the garbage collector; no live pointers remain on the C stack. Furthermore, these benefits are achieved even for portions of the program which are separately compiled, since our invention does not depend upon information propagating only within a single compilation unit such as happens with block compilation.

DETAILED DESCRIPTION OF THE INVENTION

Definitions

"subprogram", Often called a "subroutine", a "procedure", or a "function", depending upon the particular computer language.

"stack-oriented computer language". A computer language which allocates invocation frames on a last-in, first-out (LIFO) stack by allocating an invocation frame during a subprogram call and deallocating this invocation frame during a subprogram return. This LIFO stack may be implemented in a number of ways known to one skilled in the art, including the use of a continguously addressable range of computer memory and a stack pointer which is incremented and decremented. Other implementations of stacks may include the use of linked lists of frames. Examples of stack-oriented computer languages include the C [Kernighan88] [Harbison91] [Plauger92] and C++[Ellis90] [Stroustrup91] programing languages and their dialects, variants, extensions and successors.

"stack pointer". The invocation frames found on the stack of a stack-oriented computer language require that the processor keep at least one implicit pointer which points to the current such frame. This implicit pointer is call the "stack pointer", and may point the the beginning of the current frame, the end of the current frame, or some other convenient place relative to the current frame.

"application" A program consisting of a number of subprograms.

"live object". A data object that can possibly be referenced if the current program continues execution.

"accessible object". A data object that is either directly accessible to the program as a program variable (either static or dynamic), or can be reached from such a program variable by a finite sequence of pointers. Precise garbage collectors compute the set of accessible data objects. Under normal conditions, the set of accessible objects will include the set of live objects.

"garbage-collected computer language". A computer language in which storage allocation and deallocation is aided by a garbage collector (GC) which enumerates a number of roots and which locates and identifies the allocated storage which is accessible via a chain of pointers from these roots. A garbage-collected language may utilize the principles of a 'conservative' GC and may not utilize precise root or object format information.

"continuation-passing style". A style of programming in which subprogram returns are implemented by means of calls to a further functional argument called a 'continuation' which accepts the value(s) to be 'returned' from the subprogram and uses these values and objects as parameters to complete the computation. Continuation-passing style is discussed in [Fischer72] [Steele78] [Kranz86] [Appel88] [Appel92].

"tail-call optimization" or "tail-recursion optimization". An optimization in which the last call in a subprogram body releases the storage for this subprogram's invocation frame so that this storage can be reused to construct the called subprogram's invocation frame. This optimization can be used to convert simple recursions (tail recursions) into iterations.

"first-class continuation". Many programming languages provide some of the features of continuations which perform non-local transfers of control. For example, the PL/I language provides a goto operator which may exit a number of functions in the process of transferring control. The C language provides the setjmp/longjmp pair which allows the non-local transfer of control which may exit a number of functions in the process. The C++ language provides the catch/throw pair which allows the non-local transfer of control, but in a way that 'cleans up' the functions which it exits in the process. In the C and C++ languages, neither the setjmp nor the catch operations can 'capture' the current state and package it up in the form of a first-class data object which may be passed as an argument, returned as a value, and stored into a variable. The PL/I language provides for the ability to store goto labels into variables, but there is no guarantee that the label will not become meaningless due to exiting the stack frame in which the label was defined. First-class continuations, as found in Scheme and certain implementations of other advanced languages such as ML, can perform the functions of PL/I labels, C setjmp/longjmp and C++ catch/throw, but many other functions, as well. Other names for first-class continuations are "reified continuation" and "captured continuation".

"advanced computer application". An advanced computer application is one involving one or more of the following advanced programming features—tail recursion, first-class continuations and garbage collection.

The methods of the present invention compile a Scheme program, for example, to C, for example, by converting the Scheme program into continuation-passing style (CPS), and then compiling the resulting lambda expressions into individual C functions. Arguments are passed as normal C arguments, and function calls are normal C calls. Continuation closures and closure environments are passed as extra C arguments. (Of course, calls to closures perform a C call on the code portion of the closure, and pass the environment portion of the closure as an additional argument.) Such a Scheme never executes a C return, so the stack will grow and grow.

Since the C stack never contracts, we can allocate all of our closures and user data structures on this stack as automatic/dynamic/local data. All closures and user data structures whose sizes are known at compile time are statically allocated in the C stack frame; dynamic arrays and other data structures whose size is unknown at compile time can be allocated by the non-standard alloca primitive (or equivalent) available in some C implementations, which also obtains space from the C stack, or it may allocate such objects directly on the heap.

Since none of our C functions ever returns, the only live frame on the stack is the top one. However, within many of the dead frames will be found live closures and live user data objects. Eventually, the C stack will overflow the space assigned to it, and we must perform garbage collection to reclaim the space on the stack by copying the live objects off the stack into the heap.

Garbage collection (GC) by copying is a relatively straightforward process. There are a number of static roots, as well as the latest first-class continuation closure, which is passed to the GC as an argument. (Forming an explicit first-class continuation closure object for the GC avoids the necessity of scanning C stack frames.) The live objects and live closures are all copied (and thereby condensed) into another area, so that execution can be restarred with a "stack" frame at the beginning of the C "stack" allocation area.

A key point is that since only live objects need be traced by the GC—i.e., garbage (including the C frames, which are all dead) is not traced—the GC does not have to know the format of a stack frame and can be written in portable C. A Cheney-style scanner [Baker78] must know the format of all tospace objects, but we copy only first-class objects—never C frames. When the GC has finished evacuating the live objects from the stack to the heap, it returns to a frame at the base of the stack to continue execution. The GC may be called explicitly from the C code after checking whether the stack pointer has reached its preset limit. Although stack-pointer checking in this way may require a few more instructions than if it were done in assembly language, it is still faster than a trampoline call would be.

The following simplified code demonstrates how an environment object and a first-class continuation object may be passed to a constructed C function, how objects may be allocated within the local stack frame of this function, how the stack can be checked for overflow, and how the garbage collector can be called with the constructed first-class continuation object.

```
/* The following macro definition is machine-dependent. */
#ifdef stack_grows_upward
#define stack_check(sp) ((sp) >= limit)
#else
#define stack_check(sp) ((sp) <= limit)
#endif
...
object foo(env,cont,a1,a2,a3) environment env; object
cont,a1,a2,a3;
{int xyzzy; void *sp = &xyzzy; /* Where are we on the stack? */
 /* May put other local allocations here. */
 ...
 if (stack_check (sp)) /* Check allocation limit. */
        {closure5_type foo_closure; /* Locally allocate closure
          object w/ 5 slots. */
         /* Initialize first-class continuation closure foo_closure
           with env,cont,a1,a2,a3 and pointer to foo code. */
         ...
         return GC(& foo_closure) ; } /* Do GC and then execute
           foo_closure */
 /* Rest of foo code follows. */
 ...
}
```

After the GC is done copying, it must reset the C stack pointer to the beginning of the allocation area and call the continuation argument that was passed to the GC function itself. Since the GC itself has been executing out of its frame on the stack, the GC must cause the stack pointer to be reset to the base of the stack and then call the GC's continuation argument. After the live data has been copied elsewhere—this is a minor collection in the terminology of generational garbage collectors—the GC can execute a C longjmp operation to a C setjmp 'trampoline' and the setjmp can restart the continuation with the stack pointer allocating at the bottom of the stack again. Later, when the total copied data in the second area exceeds a certain amount, a major collection is performed on the second area; the second area may utilize either another copying GC, or could conceivably use a totally different kind of storage management or GC strategy from the copying GC strategy used for the stack.

An alternate (and portable) way to reset the stack pointer is for the GC to simply return, which will cause all of the functions having frames currently on the stack to also return, one by one. Since these returns do nothing but reset the stack pointer, they will not interfere with the data which has already been evacuated to the heap. The 'trampoline' in this case is a driver function which takes the continuation argument given to the GC, and then starts executing it to resume the application's computation.

Another way besides longjmp/setjmp to relocate the stack pointer is for the GC to call a (non-standard) 'alloca' function with an argument which is the difference between the current stack pointer and the desired stack pointer. Then, the GC can call its continuation.

OPERATION OF THE INVENTION

In the preferred embodiment, most object construction is initially done using stack-allocated (dynamic) local storage. This is because stack-oriented languages are optimized for operations on stack-allocated local objects. Thus, the revappend function to reverse one list onto another list looks like the following code. The appearance of the C return statement is curious, since the revappend function doesn't actually ever return. This return signals the C compiler that the local variables are all dead except for possibly the return address, and therefore the C compiler need not save those values "across" the recursive call to revappend.

The following code illustrates how one tail-recursive subprogram could be implemented (in this example, the stack overflow checking has been left out for greater clarity).

```
object revappend(cont,old,new) object cont,old,new;
    {if (old == NIL) /* First check for the end of the list. */
       {clos type *c = cont;
        /* Call continuation with new as result. */
        return (c->fn)(c_->env,new) ; }
       {cons_type *o = old; cons_type newer; /* Should check
          stack here. */
        /* Code for (revappend (cdr old) (cons (car old) new)). */
        newer.tag = cons_tag; newer.car = o->car;
        newer.cdr = new;
        return revappend(cont,o->cdr,&newer) ; } }
```

Closure objects, whose size are always known by the compiler, can be explicitly constructed in the local frame in a similar manner. Vectors and arrays whose size is unknown at compile time can be allocated by calling a non-standard alloca function (or its equivalent) to extend the current stack frame. (See also the section below on malloc-allocated objects.)

Appendix C illustrates the basic elements of the invention. A standard Lisp benchmark program called Boyer [Gabriel85] has been translated by hand into ANSI C using the teachings of this invention. The resulting program is called CBoyer, and has been tested on a number of different computer architectures. The program allocates a stack buffer of predetermined size, as well as a large heap. Since this program is intended to be illustrative of the present invention, and since the principles of generational garbage collection are well-known [Bekkers92], we have not included a garbage collector for the secondary heap in this particular example program.

This CBoyer program includes a number of C macros which compute certain primitive predicates, define certain symbols, and compose and decompose certain structures—including closure structures. On Appendix C, page 7 are defined global variables which after initialization will define the boundaries of the stack buffer, as well as hold the first-class continuation closure during the operation of the first-generation garbage collector. The Boyer benchmark program itself begins on Appendix C, page 10. The garbage collector functions occupy Appendix C, pages 14–15, and are quite classical [Baker78]. The driver program 'main_main' for the Boyer benchmark occupies Appendix C, pages 16–22. main_main first initializes the exit first-class continuation object at Appendix C, page 16, lines 705–706. At Appendix C, page 22, lines 982–983, a first-class closure created holding the initial function to call. After setting up the stack buffer it initializes a large number of data structures needed by Boyer. It then allocates the storage for the heap which forms the second generation. Finally, at Appendix C, page 22, line 1013, it sets up the setjmp, and starts the initial function of the Boyer program with the exit first-class continuation previously set up. Whenever the stack buffer is determined to have overflowed (see Appendix C, page 4, line 148), the garbage collector GC starting at Appendix C, page 15, line 649 will be called. After evacuating live objects from the stack buffer, the GC will execute the longjmp at line 685, which will take it back to page 22, line 1013, as well as contract the stack.

We note that this Cboyer program does not check for stack overflow on every call, but checks for overflow only for those calls when a subprogram's continuation is called (Appendix C, page 4, lines 145–153.). This illustrates that the invention does not depend on a firm limit for the size of the stack buffer, but this limit can be exceeded from time to time, so long as the extent of the excess is bounded by a relatively small amount. This freedom allows for more efficiency in the code which checks for stack overflow. Of course, if the stack buffer is implemented as a hardware buffer, for example as a primary cache in an advanced microprocessor, then the checking for overflow would have to be more strict.

The following sections deal with some additional details of the method of the invention.

The Heap

In the preferred embodiment, the stack of the stack-allocated language acts as the first generation of a generational garbage collector [Appel89]. Following [Appel89], we protect this generation with a write barrier. This means that if a pointer into the C stack is about to be written into a location outside the C stack, then a record of this is made in a vector or list especially constructed for this purpose. Since writes of this type are expected to be relatively rare—e.g., the application program exhibited in Appendix C does not require any such writes —the construction of such a record will not place a great burden on the executing program. This list becomes a source of additional roots for the first generation garbage collector which evacuates live objects from the stack of the stack-allocated language. There are many other possible implementations of such a generational write barrier known to one skilled in the art.

In the preferred embodiment, the heap itself may consist of one or more additional generations of a generational garbage-collected heap [Wilson92]. Similar copying garbage collection processes and write barriers can be utilized for these additional generations.

The heap of an alternative embodiment may use a different storage management and garbage collection technique from the copying one utilized for the first generation on the stack of the stack-oriented language. For example, this second generation heap could be the last generation with no further generations, and may be an 'in-place', rather than a copying, type of garbage collector.

A further alternative may use a heap with no further garbage collection whatsoever. The application may be such that the first generation filters out enough of the objects with very short lifetimes that no further storage reclamation may be required.

Call-with-current-continuation (Call/cc)

This implementation of call/cc is trivial in continuation-passing style (CPS) [Appel92], since first-class continuations are being constructed and passed on every function call. Capturing such an already-constructed first-class continuation object simply requires that the object be referenced.

Variable-arity Functions and Multiple Returned Values

Variable-arity Scheme functions may be compiled into variable-arity C functions using either the Unix varargs or the ANSI C stdarg mechanism [Kernighan88] [Harbison91] [Plauger92]. With the continuation-passing style of the method, not only are multiple returned values easily handled as multiple arguments to the continuation, but variable-arity multiple "returned" values can also be handled using variable-arity continuations.

Iteration

Scheme compilers perform a great many optimizations to ensure the efficiency of tail recursions. When using the local stack allocation taught as part of the present invention, the definition of an 'iterative' routine is narrowed considerably—only those iterations which do no storage allocation may be easily converted into an iteration, because the storage for most objects is allocated on the stack. In particular, only the lowest-level functions can operate without allocating some storage—e.g., calls to C library routines that restore the "stack" pointer can be made within an iteration. Local tail-recursion optimizations [Bartlett89] are thus sufficient to obtain efficient iteration. We thus achieve the spirit, if not the letter, of ANSI Scheme's tail-recursion law [Scheme90].

Scheme Compiler Optimizations

Scheme compilers perform a number of optimizations to reduce the cost of closure creation and the cost of function calling—e.g., they take advantage of "known" functions when compiling function calls.[1] "Lambda lifting" [Peyton-Jones87] can be used to replace closure creation by means of additional argument passing; this optimization is very valuable when arguments can be kept in registers. [AppelShao92] discusses other ways to keep variables in machine registers; these same techniques can be useful for C programs in conjunction with the present invention, as well. [Appel92] discusses a number of optimizations which are valuable in conjunction with the present invention. Various kinds of type inference can be used optimize the representation of values and avoid the need for run-time type checks. Most optimizations continue to be valuable in conjunction with the present invention —i.e., they are orthogonal to the policies of memory management.

[1] Jerôme Chailloux has told the inventor that the IBM RS6000 and HP 9700 C compilers generate slower "stubs" for indirectly-called C functions—e.g., our closures. Scheme-to-C compilers therefore generate calls to "known" functions wherever possible.

Other common Scheme optimizations include the generation of assignable cells [Kranz86] which allow more flexibility in the implementation of closures and continuations. Further optimizations may directly incorporate these assignable cells without closures and continuations under certain conditions. The present invention can always simply allocate assignable cells within the local stack-allocated frame. If the cell must later be relocated to the heap, it will be transported by the same garbage-collector mechanism that evacuates all live objects from the stack —no distinct mechanism is required.

Using C's Malloc Storage

If malloc-allocated storage is distinguishable by address range from the stack/heap storage, then malloc may be used to allocate (non-relocatable) objects. Portable implementations may prefer malloc to alloca for objects whose size is not known at compile time. These objects must be enumerable, so that the GC can first trace these objects (they must have proper tags), and then sweep and explicitly free those objects which have become garbage.

Separate Compilation

In order to obtain proper tail-recursion, existing Scheme-to-C and ML-to-C compilers do large amounts of interprocedural optimizations (including block compilations) which interfere with separate compilation, create large C functions, and cause long C compilations. In the methods of the present invention, the benefits are achieved even for separately compiled functions, because every C function which is generated by the conversion to continuation-passing style can in principle be placed into a different file and separately compiled.

Calling Normal C Functions

Calling normal (non-continuation-passing) C functions which return is trivial, except that you must assure enough "stack" space in advance so that the C "stack" does not overflow during the execution of these normal C functions. These C functions cannot store pointers to GC-able objects, except in "root" locations already known to the garbage collector, nor can they "call back" to continuation-passing-style C functions.

If such "call-back's" are required for the application, then a solution is to provide two separate C stacks—one for normal functions, and one for continuation-passing-style functions, and switch to the appropriate stack when calling a function of the other kind. This switching of C stacks can be implemented very portably by utilizing setjmp and longjmp operations in a manner analogous to the implementation of multiple processes described in [Wand80] and since implemented similarly in C. In other words, if a CPS function calls a CPS function, then it continues to use the CPS stack, whereas if a CPS function calls a normal function, then it makes the call on the normal stack. Finally, if a normal function calls a CPS function, then it makes the call on the CPS stack. Any evacuation of the CPS stack will evacuate the entire stack buffer, but this is okay, since there are only live objects, but no live stack frames, in the CPS stack buffer.

Hardware Architecture Issues

The present invention has good performance on most architectures on which copying garbage collection is efficient. The one known exception to this is the Sun Microsystems 'SPARC' architecture, which utilizes a technique known as 'register windows'. This architectural feature was developed with the presumption that bursts of stack pushes and bursts of stack pops would be rare. This presumption is incorrect for the present method, and therefore this architectural feature must be bypassed or neutralized. One solution to this problem is to compile the continuation-passing style (CPS) C program into assembly language, and then use a simple program to edit this assembly language to remove instructions which manipulate these register windows. Although this solution is very crude, it has tremendous benefits on the common SPARC architecture—the example program of Appendix C, as modified by the assembly editing program, ran three times (300%) faster than the unmodified output of the GNU C compiler for the SPARC architecture.

Conclusions

The lack of tail recursion in C may be an advantage for implementing a tail-recursive, garbage-collected language like Scheme which has first-class continuations. If all functions are transformed into continuation-passing style, if arguments are passed as C arguments (even for variable-arity functions), if C's "stack" allocation is used to perform all allocation (including closure allocation), and if a copying garbage collector is used, then a Scheme implementation on top of C which is similar to the implementation of SML/NJ [Appel92] can be achieved, except that it will be much more portable. In the present invention, the entire C "stack" is effectively the youngest generation in a generational garbage collector similar to that of SML/NJ.

A key feature of the invention is that the garbage collector avoids the necessity of tracing garbage, and therefore it need not know the format of this garbage, which includes all of the C stack frames. At the cost of continually checking and following forwarding pointers, the present invention can be made "real-time" [Baker78]. A previous paper [Baker92] also advocated allocating objects on the stack within the local stack frame. However, the current scheme is simpler, since it does not require that objects be forwarded dynamically during execution.

Many other modifications, variations and extensions of the invention will be apparent to those skilled in the art from the above description. In many areas, a number of options are available for implementing a given feature, and the choise of an implementation depends on specific design factors.

Although the invention has been described in relation to various implementations, together with modifications, variations and extensions thereof, other implementations, modifications, variations and extensions are within the scope of the invention. The invention is therefore not limited by the description and attached appendices contained herein, but only by the claims.

APPENDIX A.
LIST OF RELATED PUBLICATIONS

Abelson, H., and Sussman, G.J. *Structure and Interpretation of Computer Programs*. The MIT Press, Cambridge, MA, 1985.

[Ada94] Ada 9X Mapping/Revision Team. Ada 9X Reference Manual. ANSI/ISO DIS 8652 Draft International Standard. Intermetric, Inc., Cambridge, MA, June 1, 1994.

Aho, A.V., Sethi, R., and Ullman, J.D. *Compilers: Principles, Techniques, and Tools*. Addison-Wesley, Reading, MA, 1986.

Appel, A.W. "Garbage collection can be faster than stack allocation". *Information Procesing Letters 25*, 4 (1987), pp. 275-279.

Appel, A.W., and Jim, T. "Continuation-Passing, Closure-Passing Style". Tech. Rept. CS-TR-183-88, Computer Science Department, Princeton University, July, 1988, later published in *Conference Record of the 16th Annual ACM Symposium on Principles of Programming Languages*, Austin, TX, Jan. 11-13, 1989, pp. 293-302.

Appel, A.W. "Simple Generational Garbage Collection and Fast Allocation". *Software--Practice and Experience 19*, 2 (February 1989), pp. 171-183.

Appel, A.W. "A Runtime System". *Lisp and Symbolic Computation 3,4* (November 1990), pp. 343-380.

Appel, A.W., and MacQueen, D.B. "Standard ML of New Jersey". In Wirsing, M., ed. *Third Int'l Symp on Progr Lang Implementation and Logic Progr.*, Springer, August 1991.

Appel, A.W. *Compiling with Continuations*. Cambridge University Press, 1992.

A. 1

[AppelShao92] Appel, A.W., and Shao, Z. "Callee-save registers in continuation-passing style". Lisp and Symbolic Computation 5, 3 (1992), pp. 191-221.

Baker, H.G. "List Processing in Real Time on a Serial Computer". *Communications of the ACM 21*,4 (April 1978), pp. 280-294.

Baker, H.G. "CONS Should Not CONS Its Arguments, or, a Lazy alloc is a Smart alloc". ACM *Sigplan Notices 27*,3 (Mar. 1992), pp. 24-34.

Bartlett, J. *Compacting Garbage Collection with Ambiguous Roots.* Tech. Rept. 88/2, Digital Equipment Corporation Western Research Laboratory, February, 1988, also *Lisp Pointers 1*, 6 (April-May-June 1988), pp. 3-12.

Bartlett, J. *Scheme->C: A portable Scheme-to-C compiler.* Tech. Rept. 89/1, DEC Western Research Laboratory, 1989.

Bartley, D.H., and Jensen, J.C. "The Implementation of PC Scheme". *Proceedings of the 1986 ACM Conference on Lisp and Functional Programming*, Cambridge, MA, August 4-6, 1986, pp. 86-93.

Bekkers, Y., and Cohen, J. (Eds.) *Memory Management, International Workshop IWMM92, St. Malo, France, September 17-19, 1992, Proceedings.* Springer-Verlag, Berlin, Heidelberg, 1992.

Bobrow, D.G., and Wegbreit, B. "A Model and Stack Implementation of Multiple Environments". *Communications of the ACM 16*, 10 (October 1973), pp. 591-603.

Boehm, H.-J., and Weiser, M. "Garbage collection in an uncooperative environment." *Software Practice and Experience 18*, 9 (Sept. 1988), pp. 807-820.

Chailloux, E. "An Efficient Way of Compiling ML to C". *Proc. ACM Sigplan Workshop on ML and its Applications*, San Francisco, CA, June 20-21, 1992, pp. 37-51.

Chase, D.R. "Safety considerations for storage allocation optimizations". *Proceedings of the SIGPLAN '88 Conference on*

*Programming Language Design and Implementation*, Atlanta, GA, June 22-24, 1988, also ACM *Sigplan Notices 23*, 7 (July 1988), pp. 1-10.

Clinger, W., Hartheimer, A., and Ost, E. "Implementation strategies for continuations". *Proceedings of the 1988 ACM Conference on Lisp and Functional Programming*, Snowbird, UT, July 25-27, 1988, pp. 124-131.

Cohen, J. "Garbage Collection of Linked Data Structures". ACM *Computing Surveys 13*, 3 (September 1981), pp. 341-367.

Cridlig, R. "An optimizing ML to C compiler". *Proc. ACM Sigplan Workshop on ML and its Applications*, San Francisco, CA, June 20-21, 1992, pp. 28-36.

Danvy, O. "Memory Allocation and Higher-Order Functions". *Proceedings of the SIGPLAN '87 Symposium on Interpreters and Interpretive Techniques*, St. Paul, MN, June 24-26, 1987, also ACM *Sigplan Notices 22*, 7 (July 1987), pp. 241-252.

Deutsch, L.P., and Schiffman, A.M. "Efficient Implementation of the Smalltalk-80 System". *Conference Record of the 11th Annual ACM Symposium on Principles of Programming Languages*, Salt Lake City, UT, January 15-18, 1984, pp. 297-302.

Diwan, A., Moss, E., and Hudson, R. "Compiler Support for Garbage Collection in a Statically Typed Language". *Proceedings of the ACM SIGPLAN '92 Conference on Programming Language Design and Implementation*, San Francisco, CA, June 17-19, 1992, also ACM *Sigplan Notices 27*, 7 (July 1992), pp. 273-282.

Diwan, A., Tarditi, D., and Moss, E. "Memory Subsystem Performance of Programs Using Copying Garbage Collection". *Conference Record of POPL '94: 21st ACM SIGPLAN-SIGACT Symposium on Principles of Programming Languages*, Portland, OR, January 17-21, 1994, pp. 1-14.

Ellis, M.A., and Stroustrup, B. *The Annotated C++ Reference Manual*. Addison-Wesley, Reading, MA, 1990.

A. 3

Fischer, M.J. "Lambda Calculus Schemata". *Proceedings of an ACM Conference on Proving Assertions about Programs*, Las Cruces, NM, January, 1972, also ACM *Sigplan Notices* 7,1 (January 1972). An expanded version appeared in [Talcott93], pp. 259-287.

Friedman, D.P., and Wise, D.S. "CONS Should Not Evaluate Its Arguments". In Michaelson, S., and Milner, R., eds. *Automata, Languages and Programming*, Edinburgh U. Press, 1976, 257-284.

Gabriel, R.P. *Performance and Evaluation of Lisp Systems*. MIT Press, Cambridge, MA, 1985.

Goldberg, A., and Robson, D. *Smalltalk-80: the Language and its Implementation*. Addison-Wesley, Reading, MA, 1983.

Hanson, C. "Efficient Stack Allocation for Tail-Recursive Languages". *Proceedings of the 1990 ACM Conference on Lisp and Functional Programming*, Nice, France, June 27-29, 1990, pp. 106-118.

Hanson, C., et al. *MIT Scheme reference manual*. Tech. Rept 1281, M.I.T. A.I. Laboratory, Cambridge, MA, Jan. 1991.

Harbison, S.P., and Steele Jr., G.L. *C: A Reference Manual, Third Edition*. Prentice-Hall, Englewood Cliffs, NJ, 1991.

Haynes, C.T. Logic continuations. *J. Logic Programming* 4, 2 (June 1987), 157-176.

Hieb, R., Dybvig, R.K., and Bruggeman, C. "Representing Control in the Presence of First-Class Continuations". *Proceedings of the ACM SIGPLAN '90 Conference on Programming Language Design and Implementation*, White Plains, NY, June 20-22, 1990, also ACM *Sigplan Notices* 25, 6 (June 1990), pp. 66-77.

Johnston, J.B. "The Contour model of block structured processes". *Proc. Symp. on Data Structures in Prog. Lang.*, also ACM *Sigplan Notices* 6, 2 (February 1971), pp. 55-82.

Kernighan, B.W., and Ritchie, D.M. *The C Programming Language, Second Edition*. PTR Prentice-Hall, Englewood Cliffs, NJ, 1988.

Kranz, D., Kelsey, R., Rees, J., Hudak, P., Philbin, J., and Adams, N. "ORBIT: An Optimizing Compiler for Scheme". *Proceedings of the SIGPLAN '86 Symposium on Compiler Construction*, Palo Alto, CA, June 25-27, 1986, also ACM *Sigplan Notices 21*, 7 (July 1986), pp. 219-233.

Krasner, G.K. *Smalltalk-80: Bits of History, Words of Advice*. Addison-Wesley, Reading, MA, 1983.

Leroy, X. "The ZINC experiment: an economical implementation of the ML language". Tech. Rept., INRIA, Feb. 1990.

McCarthy, J. "Recursive Functions of Symbolic Expressions and Their Computation by Machine". *Communications of the ACM 3*, 4 (April 1960), pp. 184-195.

McDermott, D. "An Efficient Environment Allocation Scheme in an Interpreter for a Lexically-Scoped LISP". *Conference Record of the 1980 LISP Conference*, Stanford, CA, August 25-27, 1980, pp. 154-162.

McEntee, T.J "Overview of Garbage Collection in Symbolic Computing". *Lisp Pointers 1*, 3 (August-September 1987), 8-16.

Milner, R., Tofte, M., and Harper, R. *The Definition of Standard ML*. MIT Press, Cambridge, MA, 1990.

Moss, J.E.B. "Managing Stack Frames in Smalltalk". *Proceedings of the SIGPLAN '87 Symposium on Interpreters and Interpretive Techniques*, St. Paul, MN, June 24-26, 1987, also ACM *Sigplan Notices 22*, 7 (July 1987), pp. 229-240.

Peyton Jones, S.L. *The Implementation of Functional Programming Languages*. Prentice-Hall, New York, 1987.

Plauger, P.J. *The Standard C Library*. Prentice Hall, Englewood Cliffs, NJ, 1992.

Reinhold, M.B. "Cache Performance of Garbage-Collected Programs". *Proceedings of the ACM SIGPLAN '94 Conference on Programming Language Design and Implementation (PLDI)*, also ACM *Sigplan Notices 29*, 6 (June 1994), pp. 206-217.

A. 5

Reynolds, J.C. "The Discoveries of Continuations". In [Talcott93], pp. 233-247.

[Scheme90]. *IEEE Standard for the Scheme Programming Language.* IEEE-1178-1990, IEEE, New York, NY, Dec. 1990.

Stallman, R.M. *Phantom Stacks: If you look too hard, they aren't there.* AI Memo 556, MIT AI Laboratory, July 16, 1980.

Stallman, R.M. *Using and Porting GNU CC.* Free Software Foundation, Inc. February, 1990.

Steele, G.L. *Rabbit: A Compiler for Scheme (A Dialect of LISP).* Tech. Rept. AI-TR-474, Artificial Intelligence Laboratory, M.I.T., May, 1978.

Stroustrup, B. *The C++ Programming Language, Second Edition.* Addison-Wesley, Reading, MA, 1991.

Sussman, G.J., and Steele, G.L. *SCHEME: An Interpreter for Extended Lambda Calculus.* AI Memo 349, MIT AI Laboratory, December, 1975.

Suzuki, N., and Terada, M. "Creating Efficient Systems for Object-Oriented Languages". *Conference Record of the 11th Annual ACM Symposium on Principles of Programming Languages,* Salt Lake City, UT, January 15-18, 1984, pp. 290-296.

Talcott, C. *Special Issue on Continuations. Lisp and Symbolic Computation 6,* 3/4 (November 1993), pp. 229-379.

Tarditi, D., Acharya, A., and Lee, P. "No assembly required: Compiling Standard ML to C". Tech. Rept. CMU-CS-90-187, School of Computer Science, Carnegie Mellon University, also ACM *Letters on Programming Languages and Systems 1,* 2 (June 1992), pp. 161-177.

Wand, M. "Continuation-based Multiprocessing". *Conference Record of the 1980 Lisp Conference,* Stanford, CA, August 25-27, 1980, (available from ACM Press, New York), pp. 19-28.

Wilson, P.R. "Uniprocessor Garbage Collection Techniques". In [Bekkers92], pp. 1-42.

A. 6

Yasumura, M., and Okuno, H.G., eds. "Special Section on Lisp Systems in Japan". *Journal of Information Processing 13*, 3 (1990), Information Processing Society of Japan, pp. 263-417.

Yuasa, T. "Design and Implementation of Kyoto Common Lisp". In [Yasumura90], pp. 284-295

Zorn, B. "The Measured Cost of Conservative Garbage Collection". Tech. Rept. CU-CS-573-92, Dept. of Computer Science, University of Colorado at Boulder, April, 1992.

APPENDIX B
ADDITIONAL RELATED ART

A. Related Art for Stack-Oriented Languages

[Aho86] is a standard textbook on the implementation of compilers and run-time systems for computer languages, including stack-oriented languages. The entire book is relevant, but Chapter 7 "Run-Time Environments" is particularly focussed on a number of common implementation techniques for stack-oriented languages.

B. Related Art for Tail-Recursion

[Sussman75] introduces the *Scheme* language and describes an interpreter for it written in Maclisp. "Here we present a real live SCHEME interpreter. ... The basic idea behind the implementation is think machine language. In particular, we must not use recursion in the implementation language to implement recursion in the language being interpreted. This is a crucial mistake which has screwed many language implementations. The reason for this is that if the implementation language does not support certain kinds of control structures, then we will not be able to effectively interpret them. Thus, for example, if the control frame structure in the implementation language is constrained to be stack-like, then modelling more general control structures in the interpreted language will be very difficult unless we divorce ourselves from the constrained structures at the outset." [Section 8] This Scheme implementation utilizes what has come to be known as a 'trampoline', or 'dispatch loop', for achieving proper tail recursion.

[Steele78] describes the Rabbit compiler for the Scheme language, which requires that all function calls be properly *tail-recursive*.

Rabbit transforms the source program into continuation-passing style, but generates code for a register machine implemented in the Maclisp language. Proper tail-recursion is achieved by the careful generation of code for this register-based target 'machine'.

[McDermott80] describes the use of a LIFO stack for storing environment information that Scheme interpreters had previously allocated in the heap. This system attempts to grow and contract this stack in LIFO fashion unless a closure is captured.

[Bartlett89] discusses a compiler for the Scheme language which generates portable C language programs. "By using C's procedure call and return mechanisms, one is able to take advantage of these optimizations. ... However, there is a drawback to this approach: C is not properly tail-recursive, so all procedure calls result in a stack marker being pushed on the runtime stack. It would appear that the compiler writer is faced with a dilemma: use C's mechanisms and cease to be properly tail-recursive, or avoid them and lose significant amounts of optimization. After some thought, it was decided to use C's procedure call mechanism and preserve as much of the tail-recursive semantics as possible through compile-time analysis. ... [Our analysis] does have some limitations. Any procedure which must be compiled as a C procedure can only be tail-called by itself. This includes procedures defined at top level... There are certain to be those in the Scheme community who are offended by the fact that the tail-recursive properties of the language have been compromised. However, the compiler correctly handles tail-recursion in the cases where there is a big win: loops and conditional expressions."

[Hanson90] describes methods for compiling proper tail-recursion into machine language: "... the standard methods for implementing

B. 2 stack allocation assume that the language is not tail-recursive, and a straight-forward application of these methods to a tail-recursive language can result in non-tail-recursive compiled code." Hanson's methods are concerned with converting tail-recursion into machine code which is as efficient as that generated by a C compiler compiling a looping construct and assignment statements. He also mentions a scheme of Rozas and Rees: "records are popped in the return sequence but not the call sequence. If the stack overflows, a compaction process examines the records on the stack and removes those that are useless."

[Tarditi90] describes an ML-to-C compiler which was "able to successfully compile all of Standard ML into efficient and portable C code which runs on 32-bit architectures. In doing so, we have completely avoided the use of assembly language. In addition, our code generator handles extensions to Standard ML for call/cc and asynchronous signal handling. ... the target machine for a CPS program is simple. It requires a set of registers, a heap on which one can allocate records, a jump instruction, and a small set of instructions which can be used to implement the CPS primitive operators [Appel88]. ... we chose to use the CPS approach to code generation and to treat C as a target assembly language. ... Registers are implemented using global variables and the heap is implemented by an array of integers. ... The implementation of the jump instruction is problematic because labels are not first-class values in C. ... The only way to get the address of a block of C code is to encapsulate it in a C function. Since jumps are not supposed to return, we cannot use C function calls to implement jumps; for if we did, the stack would quickly overflow. Instead, we use a technique from Rabbit [Steele78] ... which we refer to as the *apply-like* procedure. ... Code execution begins with the apply-like procedure calling the

B. 3 first function to be executed. When this function wants to call another function, it returns to the apply-like procedure with the address of the next function to call. ... In this way, the depth of the stack never grows to more than 2. ... Recall that target machine registers are implemented using global variables. Most C compilers will not move global variables into real registers. ... Function calls are expensive since every function call involves a return to the apply-like procedure and then a call by the apply-like procedure. This involves two jumps. the expense is usually more than this, since many C compilers implement the return by a jump to a piece of code at the end of a function which cleans things up and then does the actual jump back to the apply-like procedure. ... Thus, the true cost of a function call is usually three jumps and some indeterminate number of loads and stores. ... We designed and implemented a series of optimizations to deal with these problems."

IEEE Scheme [Scheme90] requires that all functions be properly *tail-recursive*, in order that tail-recursive programs not require an unbounded amount of stack space. Several Scheme implementations have targeted the C language [Bartlett89] [Hanson91], because C is an efficient systems programming language which is available on nearly every computer, thus ensuring portability of the compiled code. Unfortunately, C compilers are not required to be properly tail-recursive, and only the GNU C compilers [Stallman90] attempt to achieve tail recursion in their implementations.

C. Related Art for First-Class Continuations

[Bobrow73] describes the 'spaghetti stack' implementation of stack frames for what later became known as the InterLisp language. Spaghetti stacks attempt to grow and shrink a contiguous area of memory in LIFO stack-like fashion. Spaghetti stack implementations are not compiled or interpreted in a stack-oriented language like C, but execute native machine code such as instructions for the Digital Equipment Corporation's PDP-10 computer.

[Wand80] describes the use of Scheme first-class continuations for time-sharing multiple processes. Although multiple processes were part of the original Scheme language [Sussman75], they were implemented directly, rather than by having the programming utilize first-class continuations.

[Stallman80] describes the 'phantom stack' implementation of stack frames in a native implementation of Scheme for a microprocessor chip. Phantom stacks attempt to grow and shrink a contiguous area of memory in LIFO stack-like fashion. If non-LIFO behavior is required, then the current "stack" is abandoned as a stack (but remains as a series of objects), and another stack is allocated in another contiguous area of memory.

[Suzuki84] describes the *Kiku* implementation of Smalltalk that utilizes a fixed-size stack buffer for Smalltalk 'contexts'. These contexts are copied into the heap when a context is 'captured', thus becoming normal Smalltalk objects. For computations which do no context capturing, contexts are both allocated and deallocated in the stack buffer in a LIFO manner. Kiku Smalltalk is not compiled or interpreted in a stack-oriented language like C, but it executes native machine code such as instructions for the Motorola MC68000 microprocessor.

[Deutsch84] describes an implementation of Smalltalk that incorporates both a stack and a heap. In this implementation, Smalltalk contexts are typically allocated and deallocated on the stack in a LIFO manner, and are copied to the heap only when 'captured', thus becoming normal Smalltalk objects. This Smalltalk is not compiled or interpreted in a stack-oriented language like C, but executes native machine code such as instructions for the Motorola MC68000 microprocessor.

[Bartley86] describes the *PC Scheme* implementation of Scheme for a personal computer (PC). PC Scheme utilizes a fixed-size stack buffer which is copied into the heap either when a first-class continuation object is constructed, or when the stack buffer overflows. For computations which do not capture continuations, stack frames are both allocated and deallocated in the stack buffer in a LIFO manner. PC Scheme is not compiled or interpreted in a stack-oriented language like C, but executes a byte-code register-based assembly language.

[Kranz86] describes the *Orbit* compiler for Scheme, which first converts the Scheme program into continuation-passing style (CPS). "Assignment conversion is done after CPS conversion, and amounts to introducing *cells* to hold the values of assigned variables. ... The representation analysis phase deals explicitly with the fact that assigned lexical variables have had cells introduced to hold their values. ... as an optimization, we try to avoid actually allocating separate heap storage for the introduced cells." Orbit runtime system "ensures that any continuation which is captured by *call-with-current-continuation* will be migrated dynamically to the heap."

[Danvy87] "presents a constant-time marking-collecting algorithm to efficiently implement recursion with a general heap memory rather than with a vectorial stack, in a context of frequent captures of continuations. ... This algorithm has been built into

B. 6 a virtual machine to efficiently implement at the assembly level ... a variant of SCHEME..."

[Clinger88] describes various implementation strategies for first-class continuations.

1) "The simplest strategy for ensuring that continuations have unlimited extent is to allocate them in the heap and rely on garbage collection or reference counting to recover their storage. We call this the *gc strategy*."

2) "The spaghetti stack used in Interlisp is a variation of the gc strategy. The spaghetti stack is in effect a separate heap in which storage is reclaimed by reference counting rather than garbage collection. ... In the normal case, when all frames have dynamic extent, the spaghetti stack behaves as a conventional stack."

3) "... a *heap strategy*, in which a one-bit reference count in each frame indicates whether the frame has been captured. ... The heap strategy is most practical if all continuation frames are the same size."

4) "... the *stack strategy*, in which the active continuation is represented as a contiguous stack in an area of storage we call the *stack cache*. ... When a continuation is captured, however, a copy of the entire stack cache is made and stored in the heap." "PC Scheme, for example, uses a chunked stack strategy: By maintaining a small bound on the size of the stack cache, and copying portions of the stack cache into the heap or back again as the stack cache overflows and underflows, PC Scheme reduces the worse-case latency of captures and throws." "SOAR ... [uses] a variation of the chunked stack strategy in which the copying of a captured frame is deferred until it is returned through (or a throw is performed)."

5) "The *stack/heap* strategy is similar to the stack strategy. All continuation frames are allocated in the stack cache. When a continuation is captured, however, the contents of the stack cache are moved into the heap and the stack cache is cleared." "The stack/heap strategy is used by only a few systems: Tektronix Smalltalk, BrouHaHa and MacScheme." "With the stack/heap strategy, there is never more than one copy of a continuation frame. This means that it is all right to allocate storage for assigned variables within a frame."

6) "The *incremental stack/heap strategy* is a minor variation on the stack/heap strategy: When returning through a continuation frame that isn't in the stack cache, a trap occurs and copies the frame into the stack cache."

[Bartlett89] describes a Scheme-to-C compiler '*Scheme->C*' which does not convert to continuation-passing style -- "Those familiar with the ORBIT compiler will note that this compiler [Scheme->C] does not do CPS conversion". Scheme->C allocates and deallocates C frames on the C stack in LIFO fashion until a continuation is captured, at which time the stack is copied. "When a continuation is constructed by call-with-current-continuation, the contents of the stack, display, and registers are saved and made a part of the escape procedure. When this procedure is called, it rrestores the stack, display, and registers, and then returns its argument as its value. Stack copying can be minimized by only copying the portion of the stack which has not been already copied into some other continuation and only restoring the portion of the stack which is not already in place."

B. 8

[Appel88] describes a compiler for *Standard ML of New Jersey* (*SMLNJ*). This compiler compiles ML programs into machine language by first transforming the program into continuation-passing style (CPS). "Since modern garbage collectors are so cheap, we have dispensed with the stack. ... Eliminating the stack is advantageous not only because it makes the compiler simpler. Operations like call-with-current-continuation ... are more efficient if there is no stack; a generational garbage collector can traverse just the newest call-frames, whereas it would have to traverse all the call frames on a stack... The expression handed to the target-machine instruction generator has a very simple form indeed. Procedures never return (as a result of CPS conversion) ..."

[Appel90] describes the runtime system for *Standard ML of New Jersey* (*SMLNJ*). "Since copying garbage collectors compact the live objects into consecutive memory cells, the free region [for the heap] is all contiguous. This means that to create an *n*-word object, we can just grab the next *n* words of the free space. ... Since heap allocation is so cheap, we put procedure call frames on the heap instead of on the stack. [SMLNJ] doesn't use 'procedure call frames'. Since it uses continuation-passing style, ... a 'frame' is really just the closure of a continuation. ... Since there's no runtime stack, the *call-with-current-continuation* primitive can be implemented very efficiently. ... without a stack the execution of *call/cc*, and the execution of saved continuations, take just a few instructions each."

[Hieb90] describes an implementation of *Chez Scheme* which utilizes a bounded stack allocation method for first-class continuations similar to PC Scheme [Bartley86] and phantom stacks [Stallman80].

B. 9

D. Related Art for Garbage Collection

[McCarthy60] includes an early description of garbage collection in an implementation of the Lisp language which includes a LIFO stack. This garbage collection technique has come to be known as the 'mark-sweep' technique.

[Baker78] describes a copying garbage collector for a language including a runtime stack. This paper assumes that the roots of the heap as found in registers, global variables and the stack can be unambiguously enumerated, and that the format of each heap object is known precisely enough to find and relocate each pointer.

[Cohen81] is a general review of a number of techniques of garbage collection.

[McEntee87] is a review of a number of techniques of garbage collection.

[Bartlett89] describes a compiler which compiles Scheme programs into C programs. "A review of the literature on garbage collection [Cohen81] suggests that garbage collection might be quite difficult in the C environment. Virtually all collection algorithms start with information found in a root set of pointers which must be in known locations. As a result, the collector must know the conventions for register and stack usage, which must always be followed. ... When the Scheme compiler has complete control over the emitted code, conventions can be followed. However, there is no way for a Scheme compiler generating C to enforce any register or stack usage conventions. ... As a result, any algorithm that requires the garbage collector to know exactly where the pointers are cannot be used. ... To solve this problem,

B. 10 a new garbage collection algorithm called 'mostly-copying' was devised [Bartlett88]." This mostly copying garbage collector treats the elements of the C stack as 'ambiguous roots', which *may* point to live objects, but may also be non-objects such as integers or pointers into the instructions of compiled machine code.

[Baker92] describes a mechanism for first allocating objects in the runtime stack of a stack-oriented language, and then relocating those objects to the heap prior to deallocating the stack frame in which the stack-allocated objects reside.

[Cridlig92] describes a translation of *Caml-Light*, a variant of the ML advanced computer language, into the C language. This implementation utilizes a conservative garbage collector which scans the C stack looking for ambiguous roots.

[Chailloux92] describes a translation of *CeML*, a variant of the ML advanced computer language, into the C language. This implementation uses an auxiliary stack in addition to the C stack and allocates objects within pages specialized for particular object sizes. It utilizes a conservative garbage collector which scans the auxiliary stack for roots and follows ambiguous pointers found in the heap objects.

[Diwan92] "consider[s] the problem of supporting compacting garbage collection in the presence of modern compiler optimizations. Since our collector may move any heap object, it must accurately locate, follow, and update all pointers and values derived from pointers. To assist the collector, we extend the compiler to edit tables describing live poitners, and values derived from pointers, at each program location where collection may occur."

[Bekkers92] is the proceedings of a recent workshop on garbage collection.

[Wilson92] gives a review of storage management and garbage collection techniques for uniprocessor systems.

[Diwan94] describes measurements on the copying garbage collection algorithms used in *Standard ML of New Jersey*. "To our surprise, we found that for some configurations corresponding to actual machines, such as the DECStation 5000/200, the memory subsystem performance was comparable to that of C and Fortran programs... The memory subsystem features important for achieving good performance with heap allocation are subblock placement with a subblock of one word combined with write-allocate on write-miss, a write buffer and page-mode writes, and cache sizes of 32K or larger."

[Reinhold94] discusses results that show that "Many programs written in garbage-collected languages are naturally well-suited to the direct-mapped caches typically found in modern computer systems. Garbage-collected programs written in a mostly-functional style should perform well when simple linear storage allocation and an infrequently-run generational compacting collector are employed; sophisticated collectors intended to improve cache performance are unlikely to be necessary."

APPENDIX C

```
0000 /* cboyer-1-3.c version 1.3 February 20, 1994                   */
0001 /* Changed since 1.2:                                            */
0002 /* Print version number on herald.                               */
0003 /* Functions declared with 'void' returned value.                */
0004 /* Gnu declarations indicating that functions don't return.      */
0005 /* cboyer-1-2.c version 1.2 February 16, 1994                    */
0006 /* Changed since 1.1:                                            */
0007 /* Command line args -s, -h for stack_size and heap_size, resp.  */
0008 /* cboyer-1-1.c version 1.1 February 14, 1994                    */
0009 /* Changed since 1.0:                                            */
0010 /* Fixed 'static' problem.                                       */
0011 /* Fixed message re setjmp/longjmp.                              */
0012 /* Fixed 80860 numbers due to incorrect timer info.              */
0013 /* Fixed stack direction and GC stack stuff.                     */
0014 /* cboyer-1-0.c version 1.0 February 11, 1994                    */
0015
0016 /* Copyright (c) 1994 by Nimble Computer Corporation.            */
0017 /* 16231 Meadow Ridge Way, Encino, CA 91436, U.S.A.              */
0018 /* (818) 501-4956.  FAX: (818) 986-1360.                         */
0019 /* Written by Henry G. Baker.  hbaker@netcom.com                 */
0020 /* This code is NOT public domain, but is distributed to         */
0021 /* comp.lang.scheme.c Usenet mailing list readers for comments   */
0022 /* and benchmark tests on various machines.                      */
0023
0024 /* This file is an ANSI C version of the Gabriel "Boyer Benchmark", */
0025 /* which tests the concepts in my paper "Cheney on the MTA".     */
0026 /* This CBOYER program should return 't'.                        */
0027
0028 /* Since this benchmark runs so fast on modern machines, Bob Boyer */
0029 /* (boyer@cli.com) has produced two scalable "upgrades".  The first */
0030 /* "SuperBoyer" simply changes slightly the original tautology to */
0031 /* produce more difficult problems based on a parameter N.  The  */
0032 /* second "SuperDuperBoyer" uses the same framework to prove the */
0033 /* very hard "pigeonhole principle"--N+1 pigeons cannot be placed */
0034 /* in N holes, without at least one hole receiving two pigeons.  */
0035 /* These upgrades can easily be made to this C version, as well. */
0036
0037 /* The total address space allocated is approximately            */
0038 /* STACK_SIZE*no_gcs, which is about 40 Mbytes on the Mac.  The  */
0039 /* memory space used is STACK_SIZE + 'heap bytes allocated', which */
0040 /* is a minimum when STACK_SIZE is about 256Kbytes.  CBOYER runs */
0041 /* best with optimizations which dispense with full frame building. */
0042
0043 /* On the Macintosh Plus w/ Radius 68020 Accelerator, CBOYER     */
0044 /* reaches its maximum speed of 29.6 secs. with a 14kbyte stack  */
0045 /* and uses 2,189,866 bytes of heap.  It does 2916 minor GC's.   */
0046 /* This speed is IDENTICAL to that of native compiled Coral Common */
0047 /* Lisp 1.2 on the same configuration with no garbage collections. */
0048
```

```
0049 /* On a 33 MHz Intel 80860, CBOYER reaches its maximum speed of    */
0050 /* 1.71 secs. with a 300kbyte stack and uses 1,357,468 bytes of    */
0051 /* heap.  It does 131 minor GC's.  This speed is 1.46 X faster     */
0052 /* than Kyoto Common Lisp (KCL) which compiles into C.             */
0053
0054 /* References:
0055 Appel, A.W.  "Garbage collection can be faster than stack allocation.
0056     Info. Proc. Letters 25,4 (1987), 275-279.
0057 Appel, A.W.  "Simple Generational Garbage Collection and Fast Allocation".
0058     SW Prac. & Exper. 19,2 (1989), 171+.
0059 Appel, A.W.  "A Runtime System".  Lisp&Symb Comp 3,4 (1990), 343-380.
0060 Baker, H.G.  "List Processing in Real Time on a Serial Computer".
0061     CACM 21,4 (April 1978), 280-294.
0062 Baker, H.G.  "CONS Should Not CONS Its Arguments, Part II: Cheney
0063     on the M.T.A." Draft Memorandum, Jan., 1994.
0064 Baker, H.G.  "The Boyer Benchmark Meets Linear Logic".  ACM Lisp
0065     Pointers VI, 4 (Oct/Dec 1993), 3-10.
0066 Baker, H.G.  "The Boyer Benchmark at Warp Speed".  ACM Lisp
0067     Pointers V,3 (Jul/Sep 1992), 13-14.
0068 Baker, H.G.  "CONS Should Not CONS Its Arguments".  ACM Sigplan
0069     Notices 27,3 (Mar 1992), 371-398.
0070 Cheney, C.J.  "A nonrecursive list compacting algorithm".  CACM 13,11
0071     (1970), 677-678.
0072 Diwan, A., Tarditi, D., and Moss. E.  "Memory subsystem performance
0073     of programs using copying garbage collection".  ACM POPL 21, 1994.
0074 Gabriel, R.P.  Performance and Evaluation of Lisp Systems.  MIT
0075     Press, 1986.
0076 Tarditi, D., & Lee, P.  "No assembly required: Compiling standard ML
0077     to C".  ACM LOPLAS 1,2 (1992), 161-177.
0078 */
0079
0080 /* STACK_GROWS_DOWNWARD is a machine-specific preprocessor switch. */
0081 /* It is true for the Macintosh 680X0 and the Intel 80860. */
0082 #define STACK_GROWS_DOWNWARD 1
0083
0084 /* STACK_SIZE is the size of the stack buffer, in bytes.           */
0085 /* Some machines like a smallish stack--i.e., 4k-16k, while others */
0086 /* like a biggish stack--i.e., 100k-500k.                          */
0087 #define STACK_SIZE 100000
0088
0089 /* HEAP_SIZE is the size of the 2nd generation, in bytes. */
0090 /* HEAP_SIZE should be at LEAST 225000*sizeof(cons_type). */
0091 #define HEAP_SIZE 6000000
0092
```

```
0093 /* Define size of Lisp tags.  Options are "short" or "long". */
0094 #ifdef THINK_C
0095 typedef short tag_type;
0096 #undef STACK_SIZE
0097 #define STACK_SIZE 14000
0098 #undef HEAP_SIZE
0099 #define HEAP_SIZE 3000000
0100 #define const
0101 #define volatile
0102 #else
0103 typedef long tag_type;
0104 #endif
0105
0106 #include <stdlib.h>
0107 #include <stdio.h>
0108 #include <time.h>
0109 #include <setjmp.h>
0110 #include <string.h>
0111
0112 #ifndef CLOCKS_PER_SEC
0113 /* gcc doesn't define this, even though ANSI requires it in <time.h>.. */
0114 #define CLOCKS_PER_SEC 0
0115 #define setjmp _setjmp
0116 #define longjmp _longjmp
0117 #endif
0118
0119 /* The preprocessor symbol THINK_C is used for the Macintosh. */
0120 /* (There apparently isn't a separate Mac Operating System switch). */
0121 #ifdef THINK_C
0122 #include <MemoryMgr.h>
0123 #include <console.h>
0124 #endif
0125
0126 /* The following sparc hack is courtesy of Roger Critchlow. */
0127 /* It speeds up the output by more than a factor of THREE on sparcs. */
0128 /* Do 'gcc -O -S cboyer13.c'; 'perlscript >cboyer.s'; 'gcc cboyer.s'. */
0129 #ifdef __GNUC__
0130 #ifdef sparc
0131 #define never_returns __attribute__ ((noreturn))
0132 #else
0133 #define never_returns /* __attribute__ ((noreturn)) */
0134 #endif
0135 #else
0136 #define never_returns /* __attribute__ ((noreturn)) */
0137 #endif
0138
0139 #if STACK_GROWS_DOWNWARD
0140 #define check_overflow(x,y) ((x) < (y))
0141 #else
0142 #define check_overflow(x,y) ((x) > (y))
0143 #endif
0144
```

```
0145 /* Return to continuation after checking for stack overflow. */
0146 #define return_funcall1(cfn,a1) \
0147 {char stack; \
0148  if (check_overflow(&stack,stack_limit1)) {GC(cfn,a1); return;} \
0149     else {funcall1((closure) (cfn),a1); return;}}
0150
0151 /* Evaluate an expression after checking for stack overflow. */
0152 /* (Overflow checking has been "optimized" away for this version). */
0153 #define return_check(exp) {exp; return;}
0154
0155 /* Define tag values. (I don't trust compilers to optimize enums.) */
0156 #define cons_tag 0
0157 #define symbol_tag 1
0158 #define forward_tag 2
0159 #define closure0_tag 3
0160 #define closure1_tag 4
0161 #define closure2_tag 5
0162 #define closure3_tag 6
0163 #define closure4_tag 7
0164
0165 #define nil NULL
0166 #define eq(x,y) (x == y)
0167 #define nullp(x) (x == NULL)
0168 #define or(x,y) (x || y)
0169 #define and(x,y) (x && y)
0170
0171 /* Define general object type. */
0172
0173 typedef void *object;
0174
0175 #define type_of(x) (((list) x)->tag)
0176 #define forward(x) (((list) x)->cons_car)
0177
0178 /* Define function type. */
0179
0180 typedef void (*function_type)();
0181
0182 /* Define symbol type. */
0183
0184 typedef struct {const tag_type tag; const char *pname; object plist;}
      symbol_type;
0185 typedef symbol_type *symbol;
0186
0187 #define symbol_plist(x) (((symbol_type *) x)->plist)
0188
0189 #define defsymbol(name) \
0190 static symbol_type name##_symbol = {symbol_tag, #name, nil}; \
0191 static const object quote_##name = &name##_symbol
0192
```

```
0193 /* Define cons type. */
0194
0195 typedef struct {tag_type tag; object cons_car,cons_cdr;} cons_type;
0196 typedef cons_type *list;
0197
0198 #define car(x)    (((list) x)->cons_car)
0199 #define cdr(x)    (((list) x)->cons_cdr)
0200 #define caar(x)   (car(car(x)))
0201 #define cadr(x)   (car(cdr(x)))
0202 #define cdar(x)   (cdr(car(x)))
0203 #define cddr(x)   (cdr(cdr(x)))
0204 #define caddr(x)  (car(cdr(cdr(x))))
0205 #define cadddr(x) (car(cdr(cdr(cdr(x)))))
0206
0207 #define make_cons(n,a,d) \
0208 cons_type n; n.tag = cons_tag; n.cons_car = a; n.cons_cdr = d;
0209
0210 #define atom(x) ((x == NULL) || (((cons_type *) x)->tag != cons_tag))
0211
0212 /* Closure types.  (I don't trust compilers to optimize vector refs.) */
0213
0214 typedef struct {tag_type tag; function_type fn;} closure0_type;
0215 typedef struct {tag_type tag; function_type fn; object elt1;}
     closure1_type;
0216 typedef struct {tag_type tag; function_type fn; object elt1,elt2;}
     closure2_type;
0217 typedef struct {tag_type tag; function_type fn; object elt1,elt2,elt3;}
     closure3_type;
0218 typedef struct {tag_type tag; function_type fn; object elt1,elt2,elt3,
     elt4;} closure4_type;
0219
0220 typedef closure0_type *closure0;
0221 typedef closure1_type *closure1;
0222 typedef closure2_type *closure2;
0223 typedef closure3_type *closure3;
0224 typedef closure4_type *closure4;
0225 typedef closure0_type *closure;
0226
0227 #define mclosure0(c,f) closure0_type c; c.tag = closure0_tag; c.fn = f;
0228 #define mclosure1(c,f,a) closure1_type c; c.tag = closure1_tag; \
0229     c.fn = f; c.elt1 = a;
0230 #define mclosure2(c,f,a1,a2) closure2_type c; c.tag = closure2_tag; \
0231     c.fn = f; c.elt1 = a1; c.elt2 = a2;
0232 #define mclosure3(c,f,a1,a2,a3) closure3_type c; c.tag = closure3_tag; \
0233     c.fn = f; c.elt1 = a1; c.elt2 = a2; c.elt3 = a3;
0234 #define mclosure4(c,f,a1,a2,a3,a4) closure4_type c; c.tag=closure4_tag; \
0235     c.fn = f; c.elt1 = a1; c.elt2 = a2; c.elt3 = a3; c.elt4 = a4;
0236 #define funcall0(cfn) ((cfn)->fn)(cfn)
0237 #define funcall1(cfn,a1) ((cfn)->fn)(cfn,a1)
0238 #define setq(x,e) x = e
0239
```

```
0240 #define mlist1(e1) (mcons(e1,nil))
0241 #define mlist2(e2,e1) (mcons(e2,mlist1(e1)))
0242 #define mlist3(e3,e2,e1) (mcons(e3,mlist2(e2,e1)))
0243 #define mlist4(e4,e3,e2,e1) (mcons(e4,mlist3(e3,e2,e1)))
0244 #define mlist5(e5,e4,e3,e2,e1) (mcons(e5,mlist4(e4,e3,e2,e1)))
0245 #define mlist6(e6,e5,e4,e3,e2,e1) (mcons(e6,mlist5(e5,e4,e3,e2,e1)))
0246 #define mlist7(e7,e6,e5,e4,e3,e2,e1) (mcons(e7,mlist6(e6,e5,e4,e3,e2,e1)))
0247
0248 #define rule(lhs,rhs) (mlist3(quote_equal,lhs,rhs))
0249
0250 /* Prototypes for Lisp built-in functions. */
0251
0252 static list mcons(object,object);
0253 static object terpri(void);
0254 static object prin1(object);
0255 static list assq(object,list);
0256 static object get(object,object);
0257 static object equalp(object,object);
0258 static object memberp(object,list);
0259 static char *transport(char *);
0260 static void GC(closure,object) never_returns;
0261
0262 /* Prototypes for Boyer Benchmark functions. */
0263
0264 static list add_lemma(list);
0265 static void apply_subst(closure,list,list) never_returns;
0266 static void apply_subst_lst(closure,list,list) never_returns;
0267 #define falsep(x,lst) (or(equalp(x,quote_list_f),memberp(x,lst)))
0268 static void one_way_unify(closure,list,list) never_returns;
0269 static void one_way_unify1(closure,list,list) never_returns;
0270 static void one_way_unify1_lst(closure,list,list) never_returns;
0271 static void rewrite(closure,list) never_returns;
0272 static void rewrite_args(closure,list) never_returns;
0273 static void rewrite_with_lemmas(closure,list,list) never_returns;
0274 static void tautologyp(closure,object,object,object) never_returns;
0275 static void tautp(closure,object) never_returns;
0276 static void test(closure,closure) never_returns;
0277 #define truep(x,lst) (or(equalp(x,quote_list_t),memberp(x,lst)))
0278 static void main_main(long stack_size,long heap_size,char *stack_base) never_returns;
0279 static long long_arg(int argc,char **argv,char *name,long dval);
0280
```

```
0281 /* Global variables. */
0282
0283 static clock_t start;    /* Starting time. */
0284
0285 static char *stack_begin;   /* Initialized by main. */
0286 static char *stack_limit1;  /* Initialized by main. */
0287 static char *stack_limit2;
0288
0289 static char *bottom;     /* Bottom of tospace. */
0290 static char *allocp;     /* Cheney allocate pointer. */
0291 static char *alloc_end;
0292
0293 static long no_gcs = 0; /* Count the number of GC's. */
0294
0295 static volatile object gc_cont; /* GC continuation closure. */
0296 static volatile object gc_ans; /* argument for GC continuation closure. */
0297 static jmp_buf jmp_main; /* Where to jump to. */
0298
0299 static object test_exp1, test_exp2; /* Expressions used within test. */
0300
0301 /* Define the Lisp atoms that we need. */
0302
0303 defsymbol(a);
0304 defsymbol(b);
0305 defsymbol(c);
0306 defsymbol(d);
0307 defsymbol(e);
0308 defsymbol(f);
0309 defsymbol(i);
0310 defsymbol(j);
0311 defsymbol(l);
0312 defsymbol(p);
0313 defsymbol(q);
0314 defsymbol(t);
0315 defsymbol(u);
0316 defsymbol(w);
0317 defsymbol(x);
0318 defsymbol(y);
0319 defsymbol(z);
0320 defsymbol(add1);
0321 defsymbol(and);
0322 defsymbol(append);
0323 defsymbol(cons);
0324 defsymbol(delete);
0325 defsymbol(difference);
0326 defsymbol(equal);
0327 defsymbol(fix);
0328 defsymbol(flatten);
0329 defsymbol(foo);
0330 defsymbol(greatest_factor);
0331 defsymbol(if);
0332 defsymbol(implies);
```

```
0333 defsymbol(intersect);
0334 defsymbol(lemmas);
0335 defsymbol(length);
0336 defsymbol(lessp);
0337 defsymbol(member);
0338 defsymbol(nlistp);
0339 defsymbol(not);
0340 defsymbol(numberp);
0341 defsymbol(one);
0342 defsymbol(or);
0343 defsymbol(plus);
0344 defsymbol(quotient);
0345 defsymbol(remainder);
0346 defsymbol(reverse);
0347 defsymbol(six);
0348 defsymbol(sub1);
0349 defsymbol(times);
0350 defsymbol(two);
0351 defsymbol(x1);
0352 defsymbol(x2);
0353 defsymbol(x3);
0354 defsymbol(x4);
0355 defsymbol(x5);
0356 defsymbol(x6);
0357 defsymbol(x7);
0358 defsymbol(zero);
0359 defsymbol(zerop);
0360
0361 static object quote_list_f;   /* Initialized by main to '(f) */
0362 static object quote_list_t;   /* Initialized by main to '(t) */
0363
0364 static volatile object unify_subst = nil; /* This is a global Lisp
     variable. */
0365
```

```
0366 /* These (crufty) printing functions are used for debugging. */
0367 static object terpri() {printf("\n"); return nil;}
0368
0369 static object prin1(x) object x;
0370 {if (nullp(x)) {printf("nil "); return x;}
0371  switch (type_of(x))
0372     {case closure0_tag:
0373      case closure1_tag:
0374      case closure2_tag:
0375      case closure3_tag:
0376      case closure4_tag:
0377        printf("<%ld>",((closure) x)->fn);
0378        break;
0379      case symbol_tag:
0380        printf("%s ",((symbol_type *) x)->pname);
0381        break;
0382      case cons_tag:
0383        printf("("); prin1(car(x)); printf("."); prin1(cdr(x));printf(")");
0384        break;
0385      default:
0386        printf("prin1: bad tag x=%ld\n",x); getchar(); exit(0);}
0387   return x;}
0388
0389 /* Some of these non-consing functions have been optimized from CPS. */
0390
0391 static object memberp(x,l) object x; list l;
0392 {for (; !nullp(l); l = cdr(l)) if (equalp(x,car(l))) return quote_t;
0393  return nil;}
0394
0395 static object get(x,i) object x,i;
0396 {register object plist; register object plistd;
0397  if (nullp(x)) return x;
0398  if (type_of(x)!=symbol_tag) {printf("get: bad x=%ld\n",x); exit(0);}
0399  plist = symbol_plist(x);
0400  for (; !nullp(plist); plist = cdr(plistd))
0401     {plistd = cdr(plist);
0402      if (eq(car(plist),i)) return car(plistd);}
0403  return nil;}
0404
```

```
0405 static object equalp(x,y) object x,y;
0406 {for (; ; x = cdr(x), y = cdr(y))
0407    {if (eq(x,y)) return quote_t;
0408     if (nullp(x) || nullp(y) ||
0409     type_of(x)!=cons_tag || type_of(y)!=cons_tag) return nil;
0410     if (!equalp(car(x),car(y))) return nil;}}
0411
0412 static list add_lemma(term) list term;
0413 {object plist = symbol_plist(car(cadr(term)));
0414  if (nullp(plist))
0415     {plist = mlist2(quote_lemmas,nil);
0416      symbol_plist(car(cadr(term))) = plist;}
0417  {object cell = cdr(plist);
0418   car(cell) = mcons(term,car(cell));}
0419  return term;}
0420
0421 static void apply_subst_cont1(closure2,list) never_returns;
0422
0423 static void apply_subst(cont,alist,term) closure cont; list alist,term;
0424 {if (atom(term))
0425     {list temp_temp = assq(term,alist);
0426      if (!nullp(temp_temp)) return_funcall1(cont,cdr(temp_temp));
0427      return_funcall1(cont,term);}
0428  {mclosure2(c,apply_subst_cont1,cont,car(term));
0429   return_check(apply_subst_lst((closure) &c,alist,cdr(term)));}}
0430
0431 static void apply_subst_cont1(env,dterm) closure2 env; list dterm;
0432 {make_cons(c,env->elt2,dterm);
0433  return_funcall1(env->elt1,&c);}
0434
0435 static void apply_subst_lst_cont1(closure3,list) never_returns;
0436
0437 static void apply_subst_lst(cont,alist,lst) closure cont; list alist,lst;
0438 {if (nullp(lst)) return_funcall1(cont,nil);
0439  {mclosure3(c,apply_subst_lst_cont1,cont,alist,cdr(lst));
0440   return_check(apply_subst((closure) &c,alist,car(lst)));}}
0441
0442 static void apply_subst_lst_cont2(closure2,list) never_returns;
0443
0444 static void apply_subst_lst_cont1(env,fst) closure3 env; list fst;
0445 /* env = <cont,alist,lst> */
0446 {mclosure2(c,apply_subst_lst_cont2,env->elt1,fst);
0447  return_check(apply_subst_lst((closure) &c,env->elt2,env->elt3));}
0448
0449 static void apply_subst_lst_cont2(env,rst) closure2 env; list rst;
0450 /* env = <cont,fst> */
0451 {make_cons(c,env->elt2,rst);         /* Allocate new cons cell. */
0452  return_funcall1(env->elt1,&c);}     /* Call continuation with new cons */
0453
0454 static void rewrite_cont1(closure2,list) never_returns;
0455
```

```
0456 static void rewrite(cont,term) closure cont; list term;
0457 {if (atom(term)) return_funcall1(cont,term);
0458  {mclosure2(c,rewrite_cont1,cont,car(term));
0459   return_check(rewrite_args((closure) &c,cdr(term)));}}
0460
0461 static void rewrite_cont1(env,rargs) closure2 env; list rargs;
0462 {register list aterm = env->elt2;
0463  make_cons(c,aterm,rargs);
0464  return_check(rewrite_with_lemmas(env->elt1,&c,get(aterm,quote_lemmas)));}
0465
0466 static void rewrite_args_cont1(closure2,list) never_returns;
0467
0468 static void rewrite_args(cont,lst) closure0 cont; list lst;
0469 {if (nullp(lst)) return_funcall1(cont,lst);
0470  {mclosure2(c,rewrite_args_cont1,cont,cdr(lst));
0471   return_check(rewrite((closure) &c,car(lst)));}}
0472
0473 static void rewrite_args_cont2(closure2,list) never_returns;
0474
0475 static void rewrite_args_cont1(env,rlsta) closure2 env; list rlsta;
0476 {mclosure2(c,rewrite_args_cont2,env->elt1,rlsta);
0477  return_check(rewrite_args((closure) &c,env->elt2));}
0478
0479 static void rewrite_args_cont2(env,rlstd) closure2 env; list rlstd;
0480 {make_cons(c,env->elt2,rlstd);
0481  return_funcall1(env->elt1,&c);}
0482
0483 static void one_way_unify1_lst_cont1(closure3,list) never_returns;
0484
0485 static void one_way_unify1_lst(cont,lst1,lst2) closure cont; list lst1,
     lst2;
0486 {if (nullp(lst1)) return_funcall1(cont,quote_t);
0487  {mclosure3(c,one_way_unify1_lst_cont1,cont,cdr(lst1),cdr(lst2));
0488   return_check(one_way_unify1((closure) &c,car(lst1),car(lst2)));}}
0489
0490 static void one_way_unify1_lst_cont1(env,ucars) closure3 env; list ucars;
0491 {if (nullp(ucars)) return_funcall1(env->elt1,nil);
0492  return_check(one_way_unify1_lst(env->elt1,env->elt2,env->elt3));}
0493
0494 static void one_way_unify(cont,term1,term2) closure cont; list term1,
     term2;
0495 {setq(unify_subst,nil);
0496  return_check(one_way_unify1(cont,term1,term2));}
0497
0498 static list assq(x,l) object x; list l;
0499 {for (; !nullp(l); l = cdr(l))
0500     {register list la = car(l); if (eq(x,car(la))) return la;}
0501  return nil;}
0502
```

```
0503 static void one_way_unify1(cont,term1,term2) closure cont; list term1,
     term2;
0504 {if (atom(term2))
0505    {/* inlined temp_temp = assq(term2,unify_subst); */
0506      register list l = unify_subst;
0507      for (; !nullp(l); l = cdr(l))
0508        if (eq(term2,caar(l))) return_funcall1(cont,equalp(term1,cdar(l)));
0509      {make_cons(c1,term2,term1);
0510      {make_cons(c2,&c1,unify_subst);
0511       setq(unify_subst,&c2);
0512       return_funcall1(cont,quote_t);}}}
0513  if (atom(term1)) return_funcall1(cont,nil);
0514  if (eq(car(term1),car(term2)))
0515     {return_check(one_way_unify1_lst(cont,cdr(term1),cdr(term2)));}
0516  return_funcall1(cont,nil);}
0517
0518 static void rewrite_with_lemmas_cont1(closure3,list) never_returns;
0519
0520 static void rewrite_with_lemmas(cont,term,lst) closure cont; list term,
     lst;
0521 {if (nullp(lst)) return_funcall1(cont,term);
0522  {mclosure3(c,rewrite_with_lemmas_cont1,cont,term,lst);
0523   return_check(one_way_unify((closure) &c,term,cadr(car(lst))));}}
0524
0525 static void rewrite_with_lemmas_cont2(closure1,list) never_returns;
0526
0527 static void rewrite_with_lemmas_cont1(env,ut) closure3 env; list ut;
0528 {register list lst = env->elt3;
0529  if (!nullp(ut))
0530     {mclosure1(c,rewrite_with_lemmas_cont2,env->elt1);
0531      return_check(apply_subst((closure) &c,unify_subst,caddr(car(lst))));}
0532  return_check(rewrite_with_lemmas(env->elt1,env->elt2,cdr(lst)));}
0533
0534 static void rewrite_with_lemmas_cont2(env,term) closure1 env; list term;
0535 {unify_subst = nil; /* No longer need this stuff. */
0536  return_check(rewrite(env->elt1,term));}
0537
0538 static void tautologyp_cont1(closure4,object) never_returns;
0539
```

```
0540 static void tautologyp(cont,x,true_lst,false_lst)
0541      closure cont; object x,true_lst,false_lst;
0542 {if (truep(x,true_lst)) return_funcall1(cont,quote_t);
0543  if (falsep(x,false_lst)) return_funcall1(cont,nil);
0544  if (atom(x)) return_funcall1(cont,nil);
0545  if (!eq(car(x),quote_if)) return_funcall1(cont,nil);
0546  {register object dx = cdr(x);
0547   register object adx = car(dx);
0548   if (truep(adx,true_lst))
0549      {return_check(tautologyp(cont,cadr(dx),true_lst,false_lst));}
0550   if (falsep(adx,false_lst))
0551      {return_check(tautologyp(cont,caddr(dx),true_lst,false_lst));}
0552   {mclosure4(c1,tautologyp_cont1,cont,dx,true_lst,false_lst);
0553    {make_cons(c2,adx,true_lst);
0554     return_check(tautologyp((closure) &c1,cadr(dx),&c2,false_lst));}}}}
0555
0556 static void tautologyp_cont1(env,tarm) closure4 env; object tarm;
0557 {if (nullp(tarm)) return_funcall1(env->elt1,nil);
0558  {register object dx = env->elt2;
0559   make_cons(c,car(dx),env->elt4);
0560   return_check(tautologyp(env->elt1,caddr(dx),env->elt3,&c));}}
0561
0562 static void tautp_cont1(closure1,object) never_returns;
0563
0564 static void tautp(cont,x) closure cont; object x;
0565 {mclosure1(c,tautp_cont1,cont);
0566  return_check(rewrite((closure) &c,x));}
0567
0568 static void tautp_cont1(env,rx) closure1 env; object rx;
0569 {return_check(tautologyp(env->elt1,rx,nil,nil));}
0570
0571 static void test_cont1(closure1,object) never_returns;
0572
0573 static void test(env,cont) closure env,cont;
0574 {mclosure1(cont1,test_cont1,cont);
0575  return_check(apply_subst((closure) &cont1,test_exp1,test_exp2));}
0576
0577 static void test_cont2(closure1,object) never_returns;
0578
0579 static void test_cont1(env,term) closure1 env; object term;
0580 {mclosure1(c,test_cont2,env->elt1);
0581  return_check(tautp((closure) &c,term));}
0582
0583 static void test_cont2(env,ans) closure1 env; object ans;
0584 {printf("Answer is: "); prin1(ans); terpri();
0585  return_funcall1(env->elt1,ans);}
0586
```

```
0587 static char *transport(x) char *x;
0588 /* Transport one object.  WARNING: x cannot be nil!!! */
0589 {switch (type_of(x))
0590    {case cons_tag:
0591       {register list nx = (list) allocp;
0592        type_of(nx) = cons_tag; car(nx) = car(x); cdr(nx) = cdr(x);
0593        forward(x) = nx; type_of(x) = forward_tag;
0594        allocp = ((char *) nx)+sizeof(cons_type);
0595        return (char *) nx;}
0596     case closure0_tag:
0597       {register closure0 nx = (closure0) allocp;
0598        type_of(nx) = closure0_tag; nx->fn = ((closure0) x)->fn;
0599        forward(x) = nx; type_of(x) = forward_tag;
0600        allocp = ((char *) nx)+sizeof(closure0_type);
0601        return (char *) nx;}
0602     case closure1_tag:
0603       {register closure1 nx = (closure1) allocp;
0604        type_of(nx) = closure1_tag; nx->fn = ((closure1) x)->fn;
0605        nx->elt1 = ((closure1) x)->elt1;
0606        forward(x) = nx; type_of(x) = forward_tag;
0607        x = (char *) nx; allocp = ((char *) nx)+sizeof(closure1_type);
0608        return (char *) nx;}
0609     case closure2_tag:
0610       {register closure2 nx = (closure2) allocp;
0611        type_of(nx) = closure2_tag; nx->fn = ((closure2) x)->fn;
0612        nx->elt1 = ((closure2) x)->elt1;
0613        nx->elt2 = ((closure2) x)->elt2;
0614        forward(x) = nx; type_of(x) = forward_tag;
0615        x = (char *) nx; allocp = ((char *) nx)+sizeof(closure2_type);
0616        return (char *) nx;}
0617     case closure3_tag:
0618       {register closure3 nx = (closure3) allocp;
0619        type_of(nx) = closure3_tag; nx->fn = ((closure3) x)->fn;
0620        nx->elt1 = ((closure3) x)->elt1;
0621        nx->elt2 = ((closure3) x)->elt2;
0622        nx->elt3 = ((closure3) x)->elt3;
0623        forward(x) = nx; type_of(x) = forward_tag;
0624        x = (char *) nx; allocp = ((char *) nx)+sizeof(closure3_type);
0625        return (char *) nx;}
0626     case closure4_tag:
0627       {register closure4 nx = (closure4) allocp;
0628        type_of(nx) = closure4_tag; nx->fn = ((closure4) x)->fn;
0629        nx->elt1 = ((closure4) x)->elt1;
0630        nx->elt2 = ((closure4) x)->elt2;
0631        nx->elt3 = ((closure4) x)->elt3;
0632        nx->elt4 = ((closure4) x)->elt4;
0633        forward(x) = nx; type_of(x) = forward_tag;
0634        x = (char *) nx; allocp = ((char *) nx)+sizeof(closure4_type);
0635        return (char *) nx;}
0636     case forward_tag: return (char *) forward(x);
0637     case symbol_tag:
0638     default:
```

```
0639       printf("transport: bad tag x=%ld x.tag=%ld\n",x,type_of(x));
     exit(0);}"
0640  return x;}
0641
0642 /* Use overflow macro which already knows which way the stack goes. */
0643 #define transp(p) \
0644 temp = (p); \
0645 if (check_overflow(low_limit,temp) && \
0646     check_overflow(temp,high_limit)) \
0647    (p) = (object) transport(temp);
0648
0649 static void GC(cont,ans) closure cont; object ans;
0650 {char foo;
0651  register char *scanp = allocp; /* Cheney scan pointer. */
0652  register object temp;
0653  register object low_limit = &foo; /* Move live data above us. */
0654  register object high_limit = stack_begin;
0655  no_gcs++;                       /* Count the number of minor GC's. */
0656 /* Transport GC's continuation and its argument. */
0657  transp(cont); transp(ans);
0658  gc_cont = cont; gc_ans = ans;
0659 /* Transport global variable. */
0660  transp(unify_subst);
0661  while (scanp<allocp)      /* Scan the newspace. */
0662    switch (type_of(scanp))
0663      {case cons_tag:
0664        transp(car(scanp)); transp(cdr(scanp));
0665        scanp += sizeof(cons_type); break;
0666      case closure0_tag:
0667        scanp += sizeof(closure0_type); break;
0668      case closure1_tag:
0669        transp(((closure1) scanp)->elt1);
0670        scanp += sizeof(closure1_type); break;
0671      case closure2_tag:
0672        transp(((closure2) scanp)->elt1); transp(((closure2) scanp)->elt2);
0673        scanp += sizeof(closure2_type); break;
0674      case closure3_tag:
0675        transp(((closure3) scanp)->elt1); transp(((closure3) scanp)->elt2);
0676        transp(((closure3) scanp)->elt3);
0677        scanp += sizeof(closure3_type); break;
0678      case closure4_tag:
0679        transp(((closure4) scanp)->elt1); transp(((closure4) scanp)->elt2);
0680        transp(((closure4) scanp)->elt3); transp(((closure4) scanp)->elt4);
0681        scanp += sizeof(closure4_type); break;
0682      case symbol_tag: default:
0683        printf("GC: bad tag scanp=%ld scanp.tag=%ld\n", scanp,
     type_of(scanp));
0684        exit(0);}
0685  longjmp(jmp_main,1); /* Return globals gc_cont, gc_ans. */
0686 }
0687
```

```
0688 /* This heap cons is used only for initialization. */
0689 static list mcons(a,d) object a,d;
0690 {register cons_type *c = malloc(sizeof(cons_type));
0691  c->tag = cons_tag; c->cons_car = a; c->cons_cdr = d;
0692  return c;}
0693
0694 static void my_exit(closure) never_returns;
0695
0696 static void my_exit(env) closure env;
0697 {printf("my_exit: heap bytes allocated=%ld  time=%ld ticks   no_gcs=%ld\n",
0698         allocp-bottom,clock()-start,no_gcs);
0699  printf("my_exit: ticks/second=%ld\n",(long) CLOCKS_PER_SEC);
0700  exit(0);}
0701
0702 static void main_main (stack_size,heap_size,stack_base)
0703      long stack_size,heap_size; char *stack_base;
0704 {char in_my_frame;
0705  mclosure0(clos_exit,&my_exit);  /* Create a closure for exit function. */
0706  gc_ans = &clos_exit;             /* It becomes the argument to test. */
0707  /* Allocate stack buffer. */
0708 #ifdef THINK_C
0709  SetApplLimit((Ptr) (GetApplLimit()-stack_size)); MaxApplZone();
0710 #endif
0711  stack_begin = stack_base;
0712 #if STACK_GROWS_DOWNWARD
0713  stack_limit1 = stack_begin - stack_size;
0714  stack_limit2 = stack_limit1 - 2000;
0715 #else
0716  stack_limit1 = stack_begin + stack_size;
0717  stack_limit2 = stack_limit1 + 2000;
0718 #endif
0719  printf("main: CBOYER version 1.3 Copyright (c) 1994 by Nimble Computer
     Corporation\n");
0720  printf("main: sizeof(cons_type)=%ld\n",(long) sizeof(cons_type));
0721  if (check_overflow(stack_base,&in_my_frame))
0722    {printf("main: Recompile with STACK_GROWS_DOWNWARD set to %ld\n",
0723            (long) (1-STACK_GROWS_DOWNWARD)); exit(0);}
0724  printf("main: stack_size=%ld  stack_base=%ld  stack_limit1=%ld\n",
0725          stack_size,stack_base,stack_limit1);
0726  printf("main: Try different stack sizes from 4 K to 1 Meg.\n");
0727  /* Do initializations of Lisp objects and rewrite rules. */
0728  quote_list_f = mlist1(quote_f); quote_list_t = mlist1(quote_t);
0729  /* Make temporary short names for certain atoms. */
0730  {object add1 = quote_add1;
0731   object and = quote_and;
0732   object append = quote_append;
0733   object cons = quote_cons;
0734   object delete = quote_delete;
0735   object difference = quote_difference;
0736   object equal = quote_equal;
0737   object fix = quote_fix;
0738   object flatten = quote_flatten;
```

```
0739    object foo = quote_foo;
0740    object greatest_factor = quote_greatest_factor;
0741    object implies = quote_implies;
0742    object intersect = quote_intersect;
0743    object length = quote_length;
0744    object lessp = quote_lessp;
0745    object member = quote_member;
0746    object nlistp = quote_nlistp;
0747    object not = quote_not;
0748    object numberp = quote_numberp;
0749    object one = quote_one;
0750    object or = quote_or;
0751    object plus = quote_plus;
0752    object quotient = quote_quotient;
0753    object remainder = quote_remainder;
0754    object reverse = quote_reverse;
0755    object six = quote_six;
0756    object sub1 = quote_sub1;
0757    object times = quote_times;
0758    object two = quote_two;
0759    object x1 = quote_x1;
0760    object x2 = quote_x2;
0761    object x3 = quote_x3;
0762    object x4 = quote_x4;
0763    object x5 = quote_x5;
0764    object x6 = quote_x6;
0765    object x7 = quote_x7;
0766    object zero = quote_zero;
0767    object zerop = quote_zerop;
0768    object a = quote_a;
0769    object b = quote_b;
0770    object c = quote_c;
0771    object d = quote_d;
0772    object e = quote_e;
0773    object f = quote_f;
0774    object i = quote_i;
0775    object j = quote_j;
0776    object l = quote_l;
0777    object p = quote_p;
0778    object q = quote_q;
0779    object u = quote_u;
0780    object w = quote_w;
0781    object x = quote_x;
0782    object y = quote_y;
0783    object z = quote_z;
```

```
0784  /* Define the rules, but only those that are actually referenced. */
0785  object rule_18 =
0786    add_lemma(rule(mlist3(and,p,q),
0787                   mlist4(quote_if,p,mlist4(quote_if,q,quote_list_t,
0788                                                     quote_list_f),
0789                                     quote_list_f)));
0790  object rule_19 =
0791    add_lemma(rule(mlist3(or,p,q),
0792                   mlist4(quote_if,p,quote_list_t,
0793                                     mlist4(quote_if,q,quote_list_t,quote_list_f))));
0794  object rule_21 =
0795    add_lemma(rule(mlist3(implies,p,q),
0796                   mlist4(quote_if,p,mlist4(quote_if,q,quote_list_t,
0797                                                     quote_list_f),
0798                                     quote_list_t)));
0799  object rule_23 =
0800    add_lemma(rule(mlist4(quote_if,mlist4(quote_if,a,b,c),d,e),
0801                   mlist4(quote_if,a,mlist4(quote_if,b,d,e),
0802                                     mlist4(quote_if,c,d,e))));
0803  object rule_25 =
0804    add_lemma(rule(mlist3(plus,mlist3(plus,x,y),z),
0805                   mlist3(plus,x,mlist3(plus,y,z))));
0806  object rule_26 =
0807    add_lemma(rule(mlist3(equal,mlist3(plus,a,b),mlist1(zero)),
0808                   mlist3(and,mlist2(zerop,a),mlist2(zerop,b))));
0809  object rule_27 =
0810    add_lemma(rule(mlist3(difference,x,x),mlist1(zero)));
0811  object rule_28 =
0812    add_lemma(rule(mlist3(equal,mlist3(plus,a,b),mlist3(plus,a,c)),
0813                   mlist3(equal,mlist2(fix,b),mlist2(fix,c))));
0814  object rule_29 =
0815    add_lemma(rule(mlist3(equal,mlist1(zero),mlist3(difference,x,y)),
0816                   mlist2(not,mlist3(lessp,y,x))));
0817  object rule_30 =
0818    add_lemma(rule(mlist3(equal,x,mlist3(difference,x,y)),
0819                   mlist3(and,mlist2(numberp,x),
0820                              mlist3(or,mlist3(equal,x,mlist1(zero)),
0821                                        mlist2(zerop,y)))));
0822  object rule_33 =
0823    add_lemma(rule(mlist3(append,mlist3(append,x,y),z),
0824                   mlist3(append,x,mlist3(append,y,z))));
0825  object rule_34 =
0826    add_lemma(rule(mlist2(reverse,mlist3(append,a,b)),
0827                   mlist3(append,mlist2(reverse,b),mlist2(reverse,a))));
0828  object rule_35 =
0829    add_lemma(rule(mlist3(times,x,mlist3(plus,y,z)),
0830                   mlist3(plus,mlist3(times,x,y),mlist3(times,x,z))));
0831  object rule_36 =
0832    add_lemma(rule(mlist3(times,mlist3(times,x,y),z),
0833                   mlist3(times,x,mlist3(times,y,z))));
```

```
0834  object rule_37 =
0835    add_lemma(rule(mlist3(equal,mlist3(times,x,y),mlist1(zero)),
0836                   mlist3(or,mlist2(zerop,x),mlist2(zerop,y))));
0837  object rule_40 =
0838    add_lemma(rule(mlist3(member,x,mlist3(append,a,b)),
0839                   mlist3(or,mlist3(member,x,a),mlist3(member,x,b))));
0840  object rule_41 =
0841    add_lemma(rule(mlist3(member,x,mlist2(reverse,y)),
0842                   mlist3(member,x,y)));
0843  object rule_42 =
0844    add_lemma(rule(mlist2(length,mlist2(reverse,x)),
0845                   mlist2(length,x)));
0846  object rule_43 =
0847    add_lemma(rule(mlist3(member,a,mlist3(intersect,b,c)),
0848                   mlist3(and,mlist3(member,a,b),mlist3(member,a,c))));
0849  object rule_50 =
0850    add_lemma(rule(mlist3(equal,mlist3(append,a,b),mlist3(append,a,c)),
0851                   mlist3(equal,b,c)));
0852  object rule_51 =
0853    add_lemma(rule(mlist3(plus,mlist3(remainder,x,y),
0854                         mlist3(times,y,mlist3(quotient,x,y))),
0855                   mlist2(fix,x)));
0856  object rule_54 =
0857    add_lemma(rule(mlist3(remainder,y,one),mlist1(zero)));
0858  object rule_55 =
0859    add_lemma(rule(mlist3(lessp,mlist3(remainder,x,y),y),
0860                   mlist2(not,mlist2(zerop,y))));
0861  object rule_56 =
0862    add_lemma(rule(mlist3(remainder,x,x),mlist1(zero)));
0863  object rule_57 =
0864    add_lemma(rule(mlist3(lessp,mlist3(quotient,i,j),i),
0865                   mlist3(and,mlist2(not,mlist2(zerop,i)),
0866                         mlist3(or,mlist2(zerop,j),
0867                               mlist2(not,mlist3(equal,j,one))))));
0868  object rule_58 =
0869    add_lemma(rule(mlist3(lessp,mlist3(remainder,x,y),x),
0870                   mlist4(and,mlist2(not,mlist2(zerop,y)),
0871                         mlist2(not,mlist2(zerop,x)),
0872                         mlist2(not,mlist3(lessp,x,y)))));
0873  object rule_63 =
0874    add_lemma(rule(mlist3(difference,mlist3(plus,x,y),x),
0875                   mlist2(fix,y)));
0876  object rule_64 =
0877    add_lemma(rule(mlist3(difference,mlist3(plus,y,x),x),
0878                   mlist2(fix,y)));
0879  object rule_65 =
0880    add_lemma(rule(mlist3(difference,mlist3(plus,x,y),mlist3(plus,x,z)),
0881                   mlist3(difference,y,z)));
0882  object rule_66 =
0883    add_lemma(rule(mlist3(times,x,mlist3(difference,c,w)),
0884                   mlist3(difference,mlist3(times,c,x),
         mlist3(times,w,x))));
```

```
0885    object rule_67 =
0886      add_lemma(rule(mlist3(remainder,mlist3(times,x,z),z),
0887                     mlist1(zero)));
0888    object rule_68 =
0889      add_lemma(rule(mlist3(difference,mlist3(plus,b,mlist3(plus,a,c)),a),
0890                     mlist3(plus,b,c)));
0891    object rule_69 =
0892      add_lemma(rule(mlist3(difference,mlist2(add1,mlist3(plus,y,z)),z),
0893                     mlist2(add1,y)));
0894    object rule_70 =
0895      add_lemma(rule(mlist3(lessp,mlist3(plus,x,y),mlist3(plus,x,z)),
0896                     mlist3(lessp,y,z)));
0897    object rule_71 =
0898      add_lemma(rule(mlist3(lessp,mlist3(times,x,z),mlist3(times,y,z)),
0899                     mlist3(and,mlist2(not,mlist2(zerop,z)),
0900                            mlist3(lessp,x,y))));
0901    object rule_72 =
0902      add_lemma(rule(mlist3(lessp,y,mlist3(plus,x,y)),
0903                     mlist2(not,mlist2(zerop,x))));
0904    object rule_75 =
0905      add_lemma(rule(mlist3(equal,mlist2(flatten,x),
0906                            mlist3(cons,y,mlist1(nil))),
0907                     mlist3(and,mlist2(nlistp,x),mlist3(equal,x,y))));
0908    object rule_78 =
0909      add_lemma(rule(mlist3(equal,mlist3(greatest_factor,x,y),mlist1(zero)),
0910                     mlist3(and,mlist3(or,mlist2(zerop,y),
0911                                       mlist3(equal,y,one)),
0912                            mlist3(equal,x,mlist1(zero)))));
0913    object rule_79 =
0914      add_lemma(rule(mlist3(equal,mlist3(greatest_factor,x,y),one),
0915                     mlist3(equal,x,one)));
0916    object rule_83 =
0917      add_lemma(rule(mlist3(equal,z,mlist3(times,w,z)),
0918                     mlist3(and,mlist2(numberp,z),
0919                            mlist3(or,mlist3(equal,z,mlist1(zero)),
0920                                   mlist3(equal,w,one)))));
0921    object rule_85 =
0922      add_lemma(rule(mlist3(equal,x,mlist3(times,x,y)),
0923                     mlist3(or,mlist3(equal,x,mlist1(zero)),
0924                            mlist3(and,mlist2(numberp,x),
0925                                   mlist3(equal,y,one)))));
0926    object rule_86 =
0927      add_lemma(rule(mlist3(remainder,mlist3(times,y,x),y),
0928                     mlist1(zero)));
0929    object rule_87_1 = mlist2(not,mlist3(equal,a,mlist1(zero)));
0930    object rule_87_5 = mlist3(equal,mlist2(sub1,a),mlist1(zero));
0931    object rule_87_6 = mlist3(equal,mlist2(sub1,b),mlist1(zero));
```

```
0932  object rule_87 =
0933    add_lemma(rule(mlist3(equal,mlist3(times,a,b),one),
0934                   mlist7(and,
0935                          rule_87_1,
0936                          mlist2(not,mlist3(equal,b,mlist1(zero))),
0937                          mlist2(numberp,a),
0938                          mlist2(numberp,b),
0939                          rule_87_5,
0940                          rule_87_6)));
0941  object rule_88 =
0942    add_lemma(rule(mlist3(lessp,mlist2(length,mlist3(delete,x,l)),
0943                          mlist2(length,l)),
0944                   mlist3(member,x,l)));
0945  object rule_91_37 = mlist3(cons,x3,
0946                              mlist3(cons,x4,
0947                                     mlist3(cons,x5,
0948                                            mlist3(cons,x6,x7))));
0949  object rule_91 =
0950    add_lemma(rule(mlist2(length,
0951                          mlist3(cons,x1,
0952                                 mlist3(cons,x2,rule_91_37))),
0953                   mlist3(plus,six,mlist2(length,x7))));
0954  object rule_92 =
0955    add_lemma(rule(mlist3(difference,mlist2(add1,mlist2(add1,x)),two),
0956                   mlist2(fix,x)));
0957  object rule_95 =
0958    add_lemma(rule(mlist3(plus,x,mlist2(add1,y)),
0959                   mlist4(quote_if,mlist2(numberp,y),
0960                          mlist2(add1,mlist3(plus,x,y)),
0961                          mlist2(add1,x))));
0962  object rule_96 =
0963    add_lemma(rule(mlist3(equal,mlist3(difference,x,y),
0964                          mlist3(difference,z,y)),
0965                   mlist4(quote_if,mlist3(lessp,x,y),
0966                          mlist2(not,mlist3(lessp,y,z)),
0967                          mlist4(quote_if,mlist3(lessp,z,y),
0968                                 mlist2(not,mlist3(lessp,y,x)),
0969                                 mlist3(equal,mlist2(fix,x),
0970                                        mlist2(fix,z))))));
0971  object rule_98 =
0972    add_lemma(rule(mlist3(times,x,mlist2(add1,y)),
0973                   mlist4(quote_if,mlist2(numberp,y),
0974                          mlist3(plus,x,mlist3(times,x,y)),
0975                          mlist2(fix,x))));
0976  object rule_101 =
0977    add_lemma(rule(mlist3(equal,mlist3(lessp,x,y),z),
0978                   mlist4(quote_if,mlist3(lessp,x,y),
0979                          mlist3(equal,quote_list_t,z),
0980                          mlist3(equal,quote_list_f,z))));
```

```
0981    /* Create closure for the test function. */
0982    mclosure0(run_test,&test);
0983    gc_cont = &run_test;
0984    /* Initialize constant expressions for the test runs. */
0985    test_exp1 = mlist5(mlist3(x,f,mlist3(plus,mlist3(plus,a,b),
0986                                                   mlist3(plus,c,mlist1(zero)))),
0987                       mlist3(y,f,mlist3(times,mlist3(times,a,b),
0988                                                   mlist3(plus,c,d))),
0989                       mlist3(z,f,mlist2(reverse,mlist3(append,
0990                                                                  mlist3(append,a,b),
0991                                                                  mlist1(nil)))),
0992                       mlist4(u,equal,mlist3(plus,a,b),
0993  mlist3(difference,x,y)),
0994                       mlist4(w,lessp,mlist3(remainder,a,b),
0995                                 mlist3(member,a,mlist2(length,b))));
0996    test_exp2 = mlist3(implies,
0997                       mlist3(and,mlist3(implies,x,y),
0998                              mlist3(and,mlist3(implies,y,z),
0999                                     mlist3(and,mlist3(implies,z,u),
1000                                            mlist3(implies,u,w)))),
1001                       mlist3(implies,x,w));
1002    /* Allocate heap area for second generation. */
1003    /* Use calloc instead of malloc to assure pages are in main memory. */
1004    printf("main: Allocating and initializing heap...\n");
1005    bottom = calloc(1,heap_size);
1006    allocp = (char *) ((((long) bottom)+7) & -8);
1007    alloc_end = allocp + heap_size - 8;
1008    printf("main: heap_size=%ld  allocp=%ld  alloc_end=%ld\n",
1009           (long) heap_size,allocp,alloc_end);
1010    printf("main: Try a larger heap_size if program bombs.\n");
1011    printf("Starting...\n");
1012    start = clock(); /* Start the timing clock. */
1013    /* These 2 statements form the most obscure loop in the history of C! */
1014    setjmp(jmp_main); funcall1((closure) gc_cont,gc_ans);
1015    /*                                                                    */
1016    printf("main: your setjmp and/or longjmp are broken.\n"); exit(0);}}
1017  static long long_arg(argc,argv,name,dval)
1018       int argc; char **argv; char *name; long dval;
1019  /* Thanks to George Carrette. */
1020  {int j;
1021   for(j=1;(j+1)<argc;j += 2)
1022     if (strcmp(name,argv[j]) == 0)
1023       return(atol(argv[j+1]));
1024   return(dval);}
1025
```

```
1026 main(int argc,char **argv)
1027 {
1028 #ifdef THINK_C
1029   argc = ccommand(&argv);
1030 #endif
1031  {long stack_size = long_arg(argc,argv,"-s",STACK_SIZE);
1032   long heap_size = long_arg(argc,argv,"-h",HEAP_SIZE);
1033   main_main(stack_size,heap_size,(char *) &stack_size);
1034   return 0;}}
```

I claim:

1. A method for executing an advanced application, said application comprising a number of related subprograms implemented in a stack-oriented language which includes both a stack and a heap, comprising the steps of:

converting one or more of said application subprograms into continuation-passing style (CPS) in the stack-oriented language;

determining the extent and limit points of a stack buffer on the execution stack of the stack-oriented language, which buffer is capable of holding a plurality of invocation stack frames;

commencing the execution of the application such that the initial invocation stack frame is within the limits of the stack buffer;

interrupting any of said CPS-converted subprograms when the execution stack pointer is beyond a limit point of the stack buffer;

initiating an evacuation process to transport out of the stack buffer into the heap any live data objects found in the stack buffer;

contracting the execution stack of the stack-oriented language back to the beginning of the stack buffer; and resuming the execution of the interrupted CPS-converted subprogram.

2. The method of claim 1 in which the step of CPS conversion constructs closure objects as local stack-allocated objects.

3. The method of claim 1 in which the step of CPS conversion constructs assignable cell objects as local stack-allocated objects.

4. The method of claim 1 in which the stack-oriented language is the C language.

5. The method of claim 1 in which the stack-oriented language is the C++ language.

6. A method for executing one or more mutually recursive subprograms implemented in a stack-oriented language which includes both a stack and a heap to achieve the benefits of tail recursion, comprising the steps of:

converting the subprograms into continuation-passing style (CPS) in the stack-oriented language;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

interrupting a CPS-converted subprogram when the execution stack pointer is beyond a limit point of the stack buffer;

initiating an evacuation process to transport out of the stack buffer into the heap any live data objects found in the stack buffer;

contracting the execution stack of the stack-oriented language back to the beginning of the stack buffer; and resuming the execution of the interrupted CPS-converted subprogram.

7. The method of claim 6 in which the step of CPS conversion constructs closure objects as local stack-allocated objects.

8. The method of claim 6 in which the step of CPS conversion constructs assignable cell objects as local stack-allocated objects.

9. The method of claim 6 in which the stack-oriented language is the C language.

10. The method of claim 6 in which the stack-oriented language is the C++ language.

11. A method for executing one or more subprograms of an application implemented in a stack-oriented language which includes both a stack and a heap to achieve the benefits of first-class continuations, comprising the steps of:

converting the subprograms into continuation-passing style (CPS) in the stack-oriented language so that continuation closure objects are local stack-allocated objects;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

capturing one of the stack-allocated continuation closure objects;

interrupting a CPS-converted subprogram when the execution stack pointer is beyond a limit point of the stack buffer;

initiating an evacuation process to transport out of the stack buffer into the heap any live data objects including live continuation closure objects found in the stack buffer;

contracting the execution stack of the stack-oriented language back to the beginning of the stack buffer; and resuming the execution of the interrupted CPS-converted subprogram.

12. The method of claim 11 in which the step of CPS conversion also constructs assignable cell objects as local stack-allocated objects.

13. The method of claim 11 in which the stack-oriented language is the C language.

14. The method of claim 11 in which the stack-oriented language is the C++ language.

15. A method for executing one or more subprograms of an application implemented in a stack-oriented language which includes both a stack and a heap and a further garbage collector for said heap to achieve the benefits of precise garbage collection, comprising the steps of:

converting the subprograms into continuation-passing style (CPS) in the stack-oriented language so that continuation closure objects are local stack-allocated objects;

determining the extent and limit points of a stack buffer on the execution stack of the stack-oriented language, which buffer is capable of holding a plurality of invocation stack frames;

commencing the execution of the mutually recursive subprograms such that the initial invocation stack frame is within the limits of the stack buffer;

interrupting a CPS-converted subprogram when the execution stack pointer is beyond a limit point of the stack buffer;

initiating an evacuation process to transport out of the stack buffer into the first generation of a garbage-collected heap any live data objects including live continuation closure objects found in the stack buffer;

contracting the execution stack of the stack-oriented language back to the beginning of the stack buffer; and resuming the execution of the interrupted CPS-converted subprogram.

16. The method of claim 15 in which the step of CPS conversion also constructs assignable cell objects as local stack-allocated objects.

17. The method of claim 15 in which the stack-oriented language is the C language.

18. The method of claim 15 in which the stack-oriented language is the C++ language.

* * * * *